(12) United States Patent
Miyamoto et al.

(10) Patent No.: US 9,885,168 B2
(45) Date of Patent: Feb. 6, 2018

(54) WORK VEHICLE AND CONTROL METHOD FOR SAME

(71) Applicant: KOMATSU LTD., Tokyo (JP)

(72) Inventors: Shunsuke Miyamoto, Atsugi (JP); Yasuo Fujiwara, Hiratsuka (JP); Kaoru Yasuda, Komatsu (JP)

(73) Assignee: KOMATSU LTD., Tokyo (JP)

( * ) Notice: Subject to any disclaimer, the term of this patent is extended or adjusted under 35 U.S.C. 154(b) by 172 days.

(21) Appl. No.: 14/771,531

(22) PCT Filed: Oct. 14, 2014

(86) PCT No.: PCT/JP2014/077325
§ 371 (c)(1),
(2) Date: Aug. 31, 2015

(87) PCT Pub. No.: WO2015/072264
PCT Pub. Date: May 21, 2015

(65) Prior Publication Data
US 2016/0017570 A1    Jan. 21, 2016

(30) Foreign Application Priority Data

Nov. 15, 2013   (JP) .................................. 2013-237340

(51) Int. Cl.
*F16D 31/02*     (2006.01)
*E02F 3/43*      (2006.01)
(Continued)

(52) U.S. Cl.
CPC .............. *E02F 3/431* (2013.01); *B60K 6/445* (2013.01); *B60L 7/20* (2013.01); *B60L 11/14* (2013.01);
(Continued)

(58) Field of Classification Search
CPC ........ F02D 29/04; F02D 29/06; B60W 20/14; B60W 6/445; B60W 10/10; B60W 10/105; B60L 7/20; B60L 11/14
See application file for complete search history.

(56) References Cited

U.S. PATENT DOCUMENTS

2008/0086254 A1    4/2008   Anderson et al.
2012/0004797 A1    1/2012   Baino et al.
(Continued)

FOREIGN PATENT DOCUMENTS

DE       103 04 917 A1    8/2004
EP       2 466 018 A1     6/2012
(Continued)

OTHER PUBLICATIONS

The extended European search report for the corresponding European application No. 14861713.7, dated Nov. 14, 2016.
(Continued)

*Primary Examiner* — Michael Leslie
*Assistant Examiner* — Daniel Collins
(74) *Attorney, Agent, or Firm* — Global IP Counselors, LLP

(57) ABSTRACT

A work vehicle includes a pump brake control determining unit determines that a pump brake control is to be executed for causing a braking force to be generated by using a load on a hydraulic pump during braking. A pump brake torque control unit increases a pump brake torque to correspond to the load on the hydraulic pump during the pump brake control.

16 Claims, 13 Drawing Sheets

(51) Int. Cl.
| | |
|---|---|
| B60K 6/445 | (2007.10) |
| B60L 7/20 | (2006.01) |
| B60L 11/14 | (2006.01) |
| B60W 10/00 | (2006.01) |
| B60W 10/105 | (2012.01) |
| B60W 10/18 | (2012.01) |
| B60W 10/30 | (2006.01) |
| B60W 20/00 | (2016.01) |
| F02D 29/04 | (2006.01) |
| F02D 29/06 | (2006.01) |
| B60W 10/188 | (2012.01) |
| B60W 10/196 | (2012.01) |
| B60W 30/18 | (2012.01) |
| B60W 30/188 | (2012.01) |
| B60W 10/06 | (2006.01) |
| B60W 10/10 | (2012.01) |
| B60W 10/24 | (2006.01) |
| E02F 3/42 | (2006.01) |
| E02F 9/20 | (2006.01) |
| B60W 20/14 | (2016.01) |
| E02F 3/34 | (2006.01) |

(52) U.S. Cl.
CPC ............ *B60W 10/00* (2013.01); *B60W 10/06* (2013.01); *B60W 10/10* (2013.01); *B60W 10/105* (2013.01); *B60W 10/18* (2013.01); *B60W 10/188* (2013.01); *B60W 10/196* (2013.01); *B60W 10/24* (2013.01); *B60W 10/30* (2013.01); *B60W 20/00* (2013.01); *B60W 20/14* (2016.01); *B60W 30/1884* (2013.01); *B60W 30/1886* (2013.01); *B60W 30/18109* (2013.01); *B60W 30/18127* (2013.01); *E02F 3/422* (2013.01); *E02F 9/2025* (2013.01); *F02D 29/04* (2013.01); *F02D 29/06* (2013.01); *B60W 2710/305* (2013.01); *E02F 3/34* (2013.01); *E02F 9/2075* (2013.01); *Y02T 10/6239* (2013.01); *Y10S 903/903* (2013.01)

(56) References Cited

U.S. PATENT DOCUMENTS

| | | |
|---|---|---|
| 2012/0304636 A1 | 12/2012 | Nelson et al. |
| 2013/0056279 A1 | 3/2013 | Osara et al. |
| 2013/0304292 A1 | 11/2013 | Moriki et al. |
| 2014/0023523 A1 | 1/2014 | Berg |

FOREIGN PATENT DOCUMENTS

| | | |
|---|---|---|
| JP | 61-189345 A | 8/1986 |
| JP | 7-215087 A | 8/1995 |
| JP | 2006-249990 A | 9/2006 |
| JP | 2006-329244 A | 12/2006 |
| JP | 2009-241830 A | 10/2009 |
| JP | 2010-196739 A | 9/2010 |
| JP | 2011-501714 A | 1/2011 |
| JP | 2011-80257 A | 4/2011 |
| WO | 2011148051 A1 | 12/2011 |

OTHER PUBLICATIONS

The International Search Report for the corresponding international application No. PCT/JP2014/077325, dated Jan. 27, 2015.

1

WORK VEHICLE AND CONTROL METHOD FOR SAME

CROSS-REFERENCE TO RELATED APPLICATIONS

This application is a U.S. National stage application of International Application No. PCT/JP2014/077325, filed on Oct. 14, 2014. This U.S. National stage application claims priority under 35 U.S.C. §119(a) to Japanese Patent Application No. 2013-237340, filed in Japan on Nov. 15, 2013, the entire contents of which are hereby incorporated herein by reference.

BACKGROUND

Field of the Invention

The present invention relates to a work vehicle, in particular, a hybrid-type work vehicle, and to a method for controlling the same.

Background Information

Recently, a hybrid-type work vehicle has been proposed that travels using driving power from an engine and driving power from a motor. A hydraulic-mechanical transmission (HMT) or an electric-mechanical transmission (EMT) are disclosed as power transmission devices for hybrid-type work vehicles in Japanese Unexamined Patent Application Publication No. 2006-329244 for example.

The HMT has a planetary gear mechanism, and a first pump/motor and a second pump/motor connected to rotating elements of the planetary gear mechanism. The first pump/motor and the second pump/motor function as either hydraulic motors or hydraulic pumps in response to the travel state of the work vehicle. The HMT is configured to enable stepless changing of the rotation speed of the output shaft by changing the rotation speed of the pump/motors.

An electric motor is used in the EMT in place of the hydraulic motor in the HMT. That is, the EMT has a first generator/motor and a second generator/motor. The first and second generator/motors function as either electric motors or electric generators in response to the travel state of the work vehicle. Similar to the HMT, the EMT is configured to enable stepless changing of the rotation speed of the output shaft by changing the rotation speed of the generator/motors.

The above-mentioned hybrid-type power transmission device exhibits less internal loss in the power transmission device in comparison to a conventional power transmission device (referred to below as a "torque converter-type speed change device") having a torque converter and a multi-stage speed change device. Therefore, the hybrid-type power transmission device exhibits superior efficiency when obtaining tractive force by transmitting driving power from the engine to a travel device and also has the advantage of good fuel consumption.

SUMMARY The conventional work vehicle equipped with the torque converter-type speed change device is able to obtain a braking force from an engine brake. In this case, a portion of the power (referred to below as "braking power") absorbed by braking is discarded as heat in the torque converter and the remainder is absorbed by the engine.

Conversely, the hybrid-type power transmission device discards less of the braking power as heat due to the above-mentioned superiority of the efficiency. As a result, a large portion of the braking power is returned to the engine. In this case, if the engine attempts to absorb all of the braking power, there is a possibility that the engine rotation speed may rise excessively.

If the braking power absorbed by the engine is limited, the excessive rise in the engine rotation speed may also be suppressed, but in this case there is a problem that the braking force obtained by the engine brake is reduced.

A hybrid-type work vehicle equipped with an electrical power storage device such as a capacitor is able to store a portion of the braking power as electrical energy by causing a generator/motor to generate electricity from the braking power. However, when the electrical power storage device enters a fully charged state, a portion of the braking power can no longer be stored as electrical energy and thus the braking force obtained with the engine brake is reduced.

An object of the present invention is to provide a hybrid-type work vehicle that is able to obtain a large braking force while suppressing an excessive rise in the engine rotation speed during braking, and a control method for the hybrid-type work vehicle.

A work vehicle according to a first exemplary embodiment of the present invention is equipped with an engine, a hydraulic pump, a travel device, a power transmission device, a power take-off device, and a control unit. The hydraulic pump is driven by the engine. The travel device is driven by the engine. The power transmission device transmits driving power from the engine to the travel device. The power take-off device distributes the driving power from the engine to the hydraulic pump and the power transmission device. The control unit controls the hydraulic pump and the power transmission device.

The power transmission device has an input shaft, an output shaft, a gear mechanism, and a motor. The gear mechanism has a planetary gear mechanism and transmits the rotation of the input shaft to the output shaft. The motor is connected to the rotating elements of the planetary gear mechanism. The power transmission device is configured to change a rotation speed ratio of the output shaft with respect to the input shaft by changing the rotation speed of the motor.

The control unit has a pump brake control determining unit and a pump brake torque control unit. The pump brake control determining unit determines whether to execute of a pump brake control for causing a braking force to be generated by using a load on the hydraulic pump during braking. The pump brake torque control unit increases the pump brake torque that corresponds to the load on the hydraulic pump during the pump brake control.

In this case, the pump brake torque corresponding to the load on the hydraulic pump is increased when the pump brake control is executed. Therefore, the braking power to be distributed to the hydraulic pump by the power take-off device is increased. As a result, a large braking force can be obtained while suppressing an excessive rise in the engine rotation speed during braking.

The pump brake control determining unit preferably determines that the pump brake control is to be executed when an engine regenerative torque is equal to or greater than a predetermined torque threshold. The engine regenerative torque is a torque regenerated in the engine from the travel device via the power transmission device.

In this case, the pump brake torque can be increased when the engine regenerative torque is equal to or greater than the predetermined torque threshold. For example, the pump brake torque can be increased when an engine regenerative torque that is larger than the torque that can be absorbed by the engine is generated. As a result, an excessive rise in the engine rotation speed can be suppressed.

The pump brake control determining unit preferably determines that the pump brake control is to be executed when the engine rotation speed meets or exceeds a predetermined rotation speed threshold. In this case, an excessive rise in the engine rotation speed can be suppressed.

The pump brake torque control unit preferably controls the pump brake torque on the basis of the engine regenerative torque. In this case, the magnitude of the pump brake torque can be suitably controlled in response to the size of the engine regenerative torque.

The work vehicle preferably is further provided with an energy reservoir unit for storing energy regenerated by the motor. The control unit further has a target braking power determining unit for determining a target braking power, and a reservoir power computing unit for computing a reservoir power of the energy reservoir unit. The target braking power determining unit determines the target braking power. The reservoir power computing unit computes the reservoir power of the energy reservoir unit. The pump brake torque control unit determines the engine regenerative torque on the basis of the target braking power and the reservoir power.

In this case, the braking force can be suitably controlled by determining the target braking power. Further, energy stored in the energy reservoir unit can be ensured by determining the engine regenerative torque on the basis of the target braking power and the reservoir power.

The pump brake torque control unit preferably controls the pump brake torque so that the engine rotation speed meets a target engine rotation speed while the pump brake torque is being generated. In this case, an excessive rise in the engine rotation speed can be suppressed.

The pump brake torque control unit preferably increases the pump brake torque when the vehicle speed reaches or exceeds a predetermined vehicle speed threshold. In this case, the braking force can be increased when the vehicle speed is equal to or greater than the predetermined vehicle speed threshold. As a result, an excessive rise in the vehicle speed can be suppressed.

The work vehicle is preferably further provided with a speed change operating member for selecting a speed range that defines an upper limit of the vehicle speed. The pump brake torque control unit determines the predetermined vehicle speed threshold on the basis of the speed range selected with the speed change operating member. In this case, the braking force can be increased when the vehicle speed is equal to or greater than the predetermined vehicle speed threshold according to the selected speed range. As a result, the braking force can be increased when, for example, the vehicle speed exceeds the selected speed range.

The work vehicle preferably is further provided with a forward/reverse travel operating member for switching between forward travel and reverse travel of the vehicle. The pump brake torque control unit determines the predetermined vehicle speed threshold on the basis of the selection with the forward/reverse travel operating member. In this case, the braking force can be increased when the vehicle speed is equal to or greater than the predetermined vehicle speed threshold according to the selected travel direction.

The work vehicle preferably is further provided with a work implement having a hydraulic cylinder. The hydraulic pump discharges hydraulic fluid for driving the hydraulic cylinder. In this case, the pump brake torque can be controlled by controlling the load on the hydraulic pump for driving the work implement.

The work vehicle is preferably further provided with a relief valve and a pump brake control valve. The relief valve is provided parallel to the hydraulic cylinder in a hydraulic circuit. The pump brake control valve controls the hydraulic fluid supplied to the relief valve. The pump brake torque control unit increases the load on the hydraulic pump by controlling the pump brake control valve. In this case, a gain in the load on the hydraulic pump is discarded as heat of the hydraulic fluid in the relief valve. As a result, the load on the hydraulic pump can be increased while suppressing any adverse effects on the operation of the work implement.

The work vehicle is preferably further provided with a work implement operating member for operating the work implement. The control unit further has a required pump flow rate determining unit and a work implement requirement determining unit. The required pump flow rate determining unit determines a required flow rate of the hydraulic pump on the basis of the pump brake torque. The work implement requirement determining unit determines a required flow rate of the hydraulic cylinder on the basis of the operating amount of the work implement operating member. The pump brake torque control unit determines a flow rate of the pump brake control valve on the basis of the required flow rate of the hydraulic pump and the required flow rate of the hydraulic cylinder.

In this case, a required flow rate of the hydraulic cylinder required for the operation of the work implement can be ensured. The flow rate of the pump brake control valve can be suppressed by considering the deficient portion of the required flow rate for the hydraulic cylinder as the flow rate of the pump brake control valve in order to obtain a desired pump brake torque. As a result, an excessive rise in the temperature of the hydraulic fluid can be suppressed.

The work vehicle preferably is further provided with a cooling fan for cooling cooling water for the engine, and a hydraulic motor for driving the cooling fan. The hydraulic pump discharges hydraulic fluid for driving the hydraulic motor. The pump brake torque control unit increases a load on the hydraulic pump by increasing the rotation speed of the hydraulic motor. In this case, the pump brake torque can be controlled by controlling the load on the hydraulic pump for driving a fan motor.

The work vehicle preferably is further provided with a warm-up hydraulic circuit connected to the hydraulic pump. The pump brake torque control unit increases the load on the hydraulic pump by executing a warm-up operation to increase the temperature of the hydraulic fluid using the warm-up hydraulic circuit. In this case, the pump brake torque can be controlled by controlling the load on the hydraulic pump for executing the warm-up operation.

A control method for a work vehicle according to a second exemplary embodiment of the present invention is a control method for a work vehicle equipped with an engine, a hydraulic pump, a travel device, a power transmission device, and a power take-off device. The hydraulic pump is driven by the engine. The travel device is driven by the engine. The power transmission device transmits driving power from the engine to the travel device. The power take-off device distributes the driving power from the engine to the hydraulic pump and the power transmission device.

The power transmission device has an input shaft, an output shaft, a gear mechanism, and a motor. The gear mechanism has a planetary gear mechanism and transmits the rotation of the input shaft to the output shaft. The motor is connected to the rotating elements of the planetary gear mechanism. The power transmission device is configured to change the rotation speed ratio of the output shaft with respect to the input shaft by changing the rotation speed of the motor.

The control method according to the second exemplary embodiment includes a first step and a second step. In the first step, the execution of a pump brake control for causing braking force to be generated by using a load on the hydraulic pump during braking is determined. In the second step, the pump brake torque is increased to correspond to the load on the hydraulic pump during the pump brake control.

In this case, the pump brake torque corresponding to the load on the hydraulic pump is increased when the pump brake control is executed. Therefore, the braking power to be distributed to the hydraulic pump by the power take-off device is increased. As a result, a large braking force can be obtained while suppressing an excessive rise in the engine rotation speed during braking.

Effects of Invention

The work vehicle and the control method thereof are able to obtain a large braking force while suppressing an excessive rise in the engine rotation speed during braking.

DETAILED DESCRIPTION OF EXEMPLARY EMBODIMENTS

Figure 1:
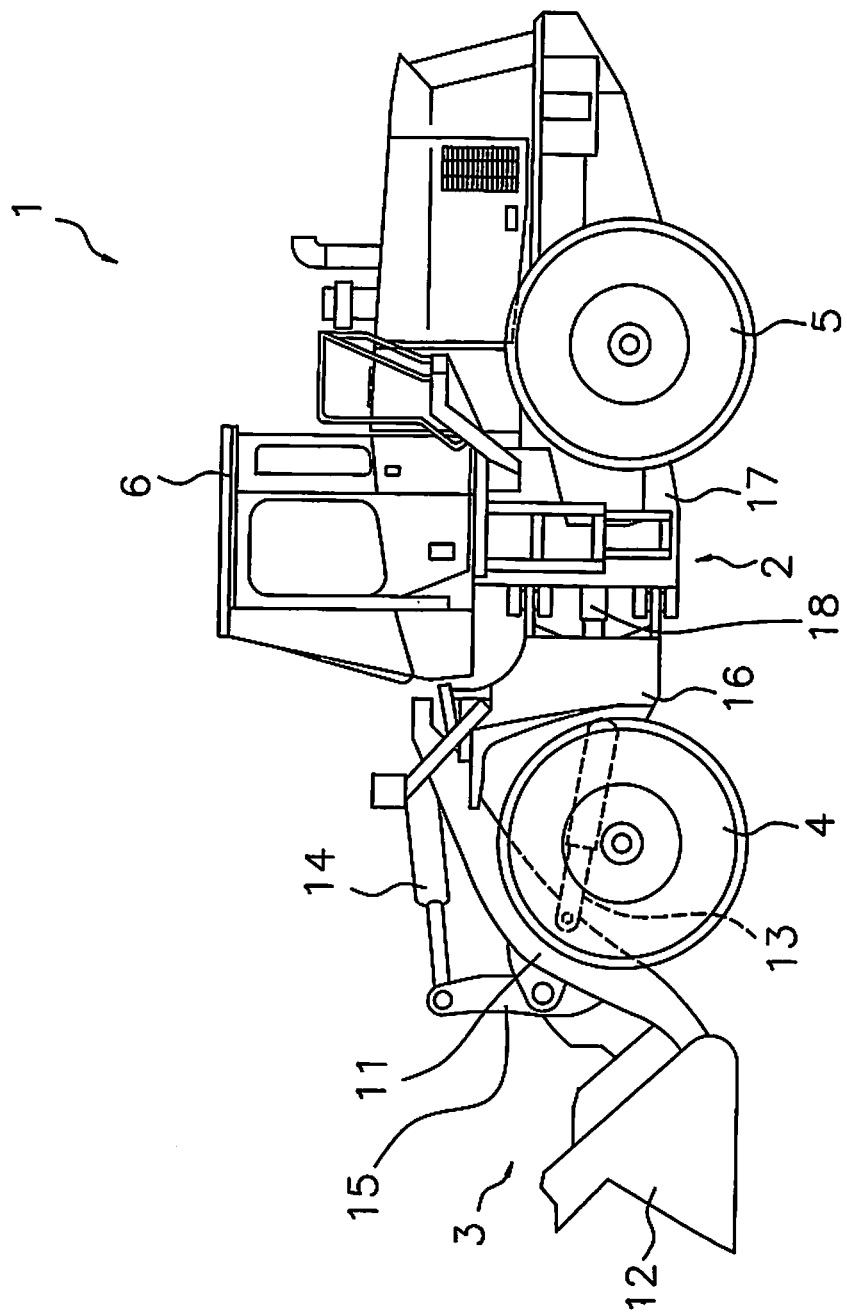
FIG. 1 is a side view of a work vehicle according to an exemplary embodiment of the present invention.

Exemplary embodiments of the present invention will be explained in detail with reference to the figures. FIG. 1 is a side view of a work vehicle 1 according to an exemplary embodiment of the present invention. As illustrated in FIG. 1, the work vehicle 1 is equipped with a vehicle body frame 2, a work implement 3, traveling wheels 4 and 5, and an operating cabin 6. The work vehicle 1 is a wheel loader and travels due to the traveling wheels 4 and 5 being rotated and driven. The work vehicle 1 is able to carry out work, such as excavation and the like, by using the work implement 3.

The work implement 3 and the traveling wheels 4 and 5 are attached to the vehicle body frame 2. The work implement 3 is driven by hydraulic fluid from a below-mentioned work implement pump 23 (see FIG. 2). The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 due to hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 due to hydraulic fluid from the work implement pump 23.

The operating cabin 6 is attached to the vehicle body frame 2. The operating cabin 6 is mounted on the vehicle body frame 2. A seat for the operator and a below-mentioned operating device are disposed in the operating cabin 6. The vehicle body frame 2 has a front frame 16 and a rear frame 17. The front frame 16 and the rear frame 17 are attached to each other in a manner that allows swinging in the left-right direction.

The work vehicle 1 has a steering cylinder 18. The steering cylinder 18 is attached to the front frame 16 and the rear frame 17. The steering cylinder 18 is a hydraulic cylinder. The work vehicle 1 is able to change the traveling direction to the right and left with the extension and contraction of the steering cylinder 18 due to hydraulic fluid from a below-mentioned steering pump 30.

Figure 2:
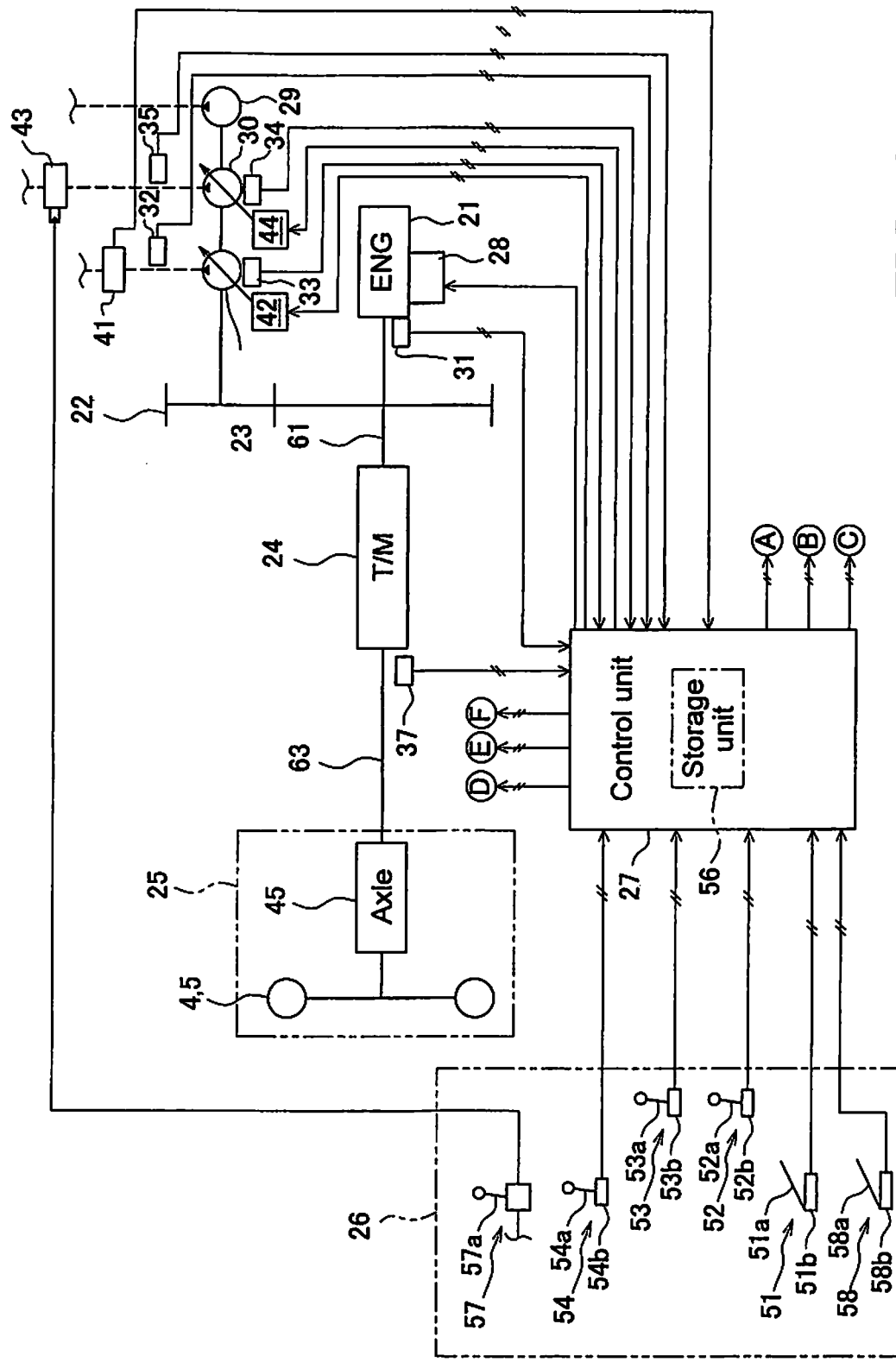
FIG. 2 is a schematic view of a configuration of the work vehicle.

FIG. 2 is a schematic view of a configuration of the work vehicle 1. As illustrated in FIG. 2, the work vehicle 1 is equipped with an engine 21, a power take-off device 22 (referred to below as a "PTO 22"), a power transmission device 24, a travel device 25, an operating device 26, and a control unit 27.

The engine 21 is, for example, a diesel engine. The output of the engine 21 is controlled by adjusting the amount of fuel injected into the cylinders of the engine 21. The adjustment of the amount of fuel is conducted by the control unit 27 controlling a fuel injection device 28 attached to the engine 21. The work vehicle 1 is equipped with an engine rotation speed detecting unit 31. The engine rotation speed detecting unit 31 detects the engine rotation speed and transmits a detection signal indicating the engine rotation speed to the control unit 27.

The work vehicle 1 has the work implement pump 23, the steering pump 30, and a transmission pump 29. The work implement pump 23, the steering pump 30, and the transmission pump 29 are hydraulic pumps. The PTO 22 (power take-off) transmits a portion of the driving power from the engine 21 to the hydraulic pumps 23, 30, and 29. That is, the PTO 22 distributes the driving power from the engine 21 to the power transmission device 24 and the hydraulic pumps 23, 30, and 29.

The work implement pump 23 is driven by driving power from the engine 21. The hydraulic fluid discharged from the work implement pump 23 is supplied to the lift cylinder 13 and the bucket cylinder 14 through a work implement control valve 41. The work vehicle 1 is equipped with a work implement pump pressure detecting unit 32. The work implement pump pressure detecting unit 32 detects a discharge pressure (referred to below as "work implement pump pressure") of hydraulic fluid from the work implement pump 23 and transmits a detection signal indicating the work implement pump pressure to the control unit 27.

The work implement pump 23 is a variable displacement hydraulic pump. The discharge capacity of the work implement pump 23 is changed by changing the tilt angle of a skew plate or an inclined shaft of the work implement pump 23. A first capacity control device 42 is connected to the work implement pump 23. The first capacity control device 42 is controlled by the control unit 27 and changes the tilt angle of the work implement pump 23. As a result, the discharge capacity of the work implement pump 23 is controlled by the control unit 27. The work vehicle 1 is equipped with a first tilt angle detecting part 33. The first tilt angle detecting part 33 detects the tilt angle of the work implement pump 23 and transmits a detection signal indicating the tilt angle to the control unit 27.

The steering pump 30 is driven by driving power from the engine 21. The hydraulic fluid discharged from the steering pump 30 is supplied to the above-mentioned steering cylinder 18 through a steering control valve 43. The work vehicle 1 is equipped with a steering pump pressure detecting unit 34. The steering pump pressure detecting unit 34 detects the discharge pressure (referred to below as "steering pump pressure") of hydraulic fluid from the steering pump 30 and transmits a detection signal indicating the steering pump pressure to the control unit 27.

The steering pump 30 is a variable displacement hydraulic pump. The discharge capacity of the steering pump 30 is changed by changing the tilt angle of a skew plate or an inclined shaft of the steering pump 30. A second capacity control device 44 is connected to the steering pump 30. The second capacity control device 44 is controlled by the control unit 27 and changes the tilt angle of the steering pump 30. As a result, the discharge capacity of the steering pump 30 is controlled by the control unit 27. The work vehicle 1 is equipped with a second tilt angle detecting part 35. The second tilt angle detecting part 35 detects the tilt angle of the steering pump 30 and transmits a detection signal indicating the tilt angle to the control unit 27.

Figure 3:
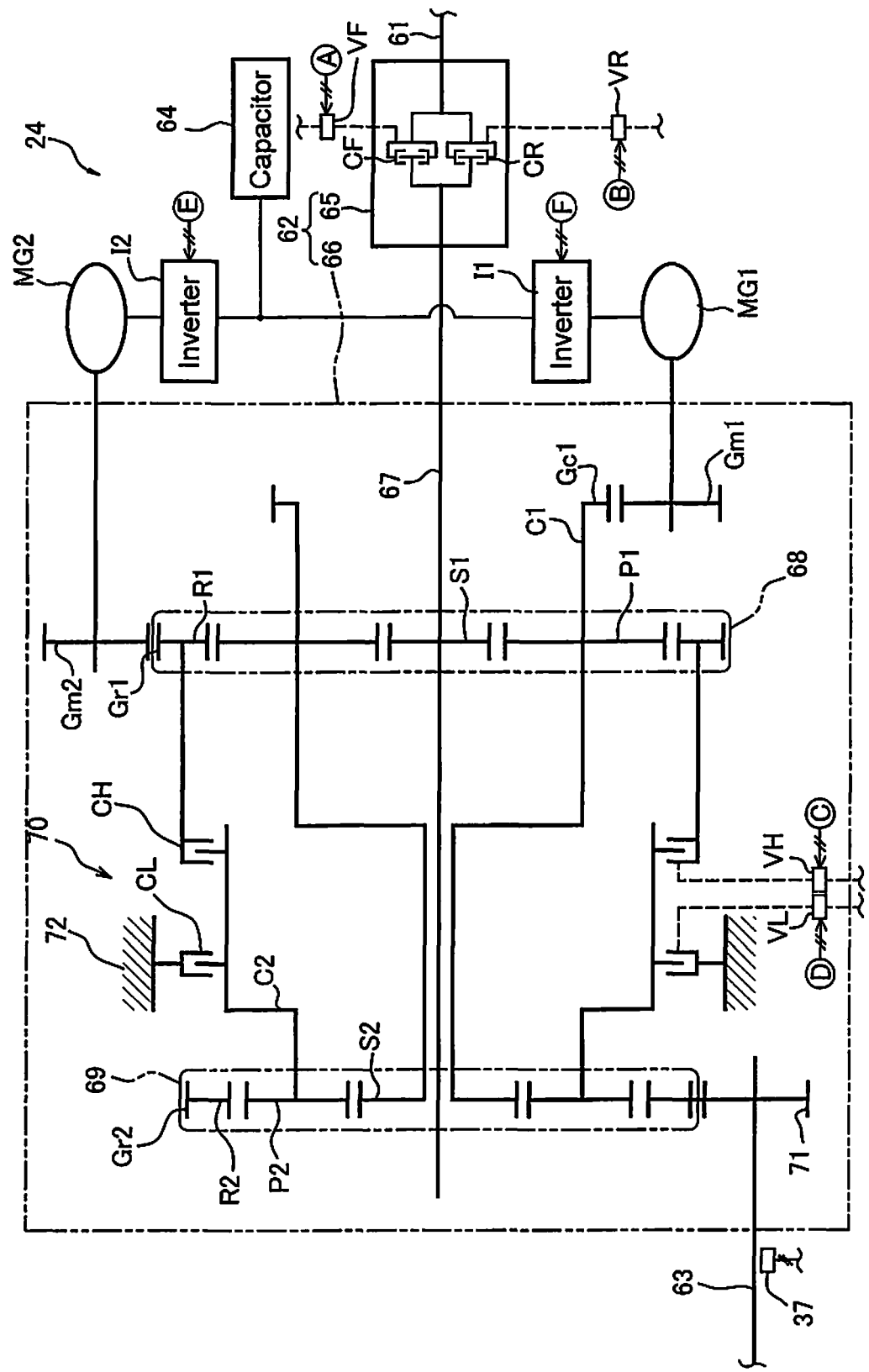
FIG. 3 is a schematic view of a configuration of a power transmission device.

The transmission pump 29 is driven by driving power from the engine 21. The transmission pump 29 is a fixed displacement hydraulic pump. Hydraulic fluid discharged from the transmission pump 29 is supplied to clutches CF, CR, CL, and CH (FIG. 3) of the power transmission device 24 via below-mentioned clutch control valves VF, VR, VL, and VH (FIG. 3).

The PTO 22 transmits a portion of the driving power from the engine 21 to the power transmission device 24. The power transmission device 24 transmits the driving power from the engine 21 to the travel device 25. The power transmission device 24 changes the speed and outputs the driving power from the engine 21. An explanation of the configuration of the power transmission device 24 is provided in detail below.

The travel device 25 has an axle 45 and the traveling wheels 4 and 5. The axle 45 transmits driving power from the power transmission device 24 to the traveling wheels 4 and 5. As a result, the traveling wheels 4 and 5 rotate. The work vehicle 1 is equipped with a vehicle speed detecting unit 37. The vehicle speed detecting unit 37 detects the rotation speed (referred to below as "output rotation speed") of an output shaft 63 of the power transmission device 24. The output rotation speed corresponds to the vehicle speed and consequently the vehicle speed detecting unit 37 detects the vehicle speed by detecting the output rotation speed. The vehicle speed detecting unit 37 detects the rotating direction of the output shaft 63. The rotating direction of the output shaft 63 corresponds to the traveling direction of the work vehicle 1 and consequently the vehicle speed detecting unit 37 functions as a traveling direction detecting unit that detects the traveling direction of the work vehicle 1 by detecting the rotating direction of the output shaft 63. The vehicle speed detecting unit 37 transmits detection signals indicating the output rotation speed and the rotating direction to the control unit 27.

The operating device 26 is operated by the operator. The operating device 26 has an accelerator operating device 51, a work implement operating device 52, a speed change operating device 53, a forward/reverse travel operating device 54 (referred to below as "FR operating device 54"), a steering operating device 57, and a brake operating device 58.

The accelerator operating device 51 has an accelerator operating member 51a and an accelerator operation detecting unit 51b. The accelerator operating member 51a is operated in order to set a target rotation speed of the engine 21. The accelerator operation detecting unit 51b detects an operating amount (referred to below as "accelerator operating amount") of the accelerator operating member 51a. The accelerator operation detecting unit 51b transmits a detection signal indicating the accelerator operating amount to the control unit 27.

The work implement operating device 52 has a work implement operating member 52a and a work implement operation detecting unit 52b. The work implement operating member 52a is operated in order to actuate the work implement 3. The work implement operation detecting unit 52b detects a position of the work implement operating member 52a. The work implement operation detecting unit 52b outputs a detection signal indicating the position of the work implement operating member 52a to the control unit 27. The work implement operation detecting unit 52b detects an operating amount of the work implement operating member 52a by detecting a position of the work implement operating member 52a.

The speed change operating device 53 has a speed change operating member 53a and a speed change operation detecting unit 53b. The operator is able to select a speed range of the power transmission device 24 by operating the speed change operating member 53a. The speed change operation detecting unit 53b detects a position of the speed change operating member 53a. The position of the speed change operating member 53a corresponds to a plurality of speed ranges such as a first speed and a second speed and the like. The speed change operation detecting unit 53b outputs a detection signal indicating the position of the speed change operating member 53a to the control unit 27.

The FR operating device 54 has a forward/reverse travel operating member 54a (referred to below as "FR operating member 54a") and a forward/reverse travel position detecting unit 54b (referred to below as a "FR position detecting unit 54b"). The operator can switch between forward and reverse travel of the work vehicle 1 by operating the FR operating member 54a. The FR operating member 54a is selectively switched between a forward travel position (F), a neutral position (N), and a reverse travel position (R). The FR position detecting unit 54b detects a position of the FR operating member 54*a*. The FR position detecting unit 54*b* outputs a detection signal indicating the position of the FR operating member 54*a* to the control unit 27.

The steering operating device 57 has a steering operating member 57*a*. The steering operating device 57 drives a steering control valve 43 by supplying pilot hydraulic pressure based on an operation of the steering operating member 57*a* to the steering control valve 43. The steering operating device 57 may drive the steering control valve 43 by converting an operation of the steering operating member 57*a* to an electrical signal. The operator is able to change the travel direction of the work vehicle 1 to the right or left by operating the steering operating member 57*a*.

The brake operating device 58 has a brake operating member 58*a* and a brake operation detecting unit 58*b*. The operator is able to operate a braking force of the work vehicle 1 by operating the brake operating member 58*a*. The brake operation detecting unit 58*b* detects an operating amount of the brake operating member 58*a* (referred to below as "brake operating amount"). The brake operation detecting unit 58*b* outputs a detection signal indicating the brake operating amount to the control unit 27. The pressure of brake oil may be used as the brake operating amount.

The control unit 27 has a calculation device, such as a CPU, and a memory, such as a RAM or a ROM, and conducts various types of processing for controlling the work vehicle 1. The control unit 27 has the storage unit 56. The storage unit 56 stores various types of programs and data for controlling the work vehicle 1.

The control unit 27 transmits a command signal indicating a command throttle value to the fuel injection device 28 so that a target rotation speed of the engine 21 is obtained in accordance with the accelerator operating amount. The control of the engine 21 by the control unit 27 is described in detail below.

The control unit 27 controls hydraulic pressure supplied to the hydraulic cylinders 13 and 14 by controlling the work implement control valve 41 on the basis of the detection signals from the work implement operation detecting unit 52*b*. As a result, the hydraulic cylinders 13 and 14 expand or contract to operate the work implement 3.

The control unit 27 controls the power transmission device 24 on the basis of the detection signals from each of the detecting units. The control of the power transmission device 24 by the control unit 27 is described in detail below.

An explanation of the configuration of the power transmission device 24 is provided in detail below. FIG. 3 is a schematic view of a configuration of the power transmission device 24. As illustrated in FIG. 3, the power transmission device 24 is provided with an input shaft 61, a gear mechanism 62, the output shaft 63, a first motor MG1, a second motor MG2, and a capacitor 64. The input shaft 61 is connected to the above-mentioned PTO 22. The rotation from the engine 21 is inputted to the input shaft 61 via the PTO 22. The gear mechanism 62 transmits the rotation of the input shaft 61 to the output shaft 63. The output shaft 63 is connected to the above-mentioned travel device 25, and transmits the rotation from the gear mechanism 62 to the above-mentioned travel device 25.

The gear mechanism 62 is a mechanism for transmitting driving power from the engine 21. The gear mechanism 62 is configured so that the rotation speed ratio of the output shaft 63 with respect to the input shaft 61 is changed in response to changes in the rotation speeds of the motors MG1 and MG2. The gear mechanism 62 has a FR switch mechanism 65, and a speed change mechanism 66.

The FR switch mechanism 65 has a forward travel clutch CF (referred to below as "F-clutch CF"), a reverse travel clutch CR (referred to below as "R-clutch CR"), and various other gears not illustrated. The F-clutch CF and the R-clutch CR are hydraulic clutches and hydraulic fluid is supplied from the transmission pump 29 to the clutches CF and CR. The hydraulic fluid for the F-clutch CF is controlled by an F-clutch control valve VF. The hydraulic fluid for the R-clutch CR is controlled by an R-clutch control valve VR. The clutch control valves CF and CR are controlled by command signals from the control unit 27.

The direction of the rotation outputted from the FR switch mechanism 65 is switched due to the switching between connected/disconnected states of the F-clutch CF and disconnected/connected states of the R-clutch CR. Specifically, the F-clutch CF is connected and the R-clutch CR is disconnected when the vehicle is traveling forward. The F-clutch CF is disconnected and the R-clutch CR is connected when the vehicle is traveling in reverse.

The speed change mechanism 66 has a transmission shaft 67, a first planetary gear mechanism 68, a second planetary gear mechanism 69, a Hi/Lo switch mechanism 70, and an output gear 71. The transmission shaft 67 is coupled to the FR switch mechanism 65. The first planetary gear mechanism 68 and the second planetary gear mechanism 69 are disposed on the same axis as the transmission shaft 67.

The first planetary gear mechanism 68 has a first sun gear S1, a plurality of first planet gears P1, a first carrier C1 that supports the plurality of first planet gears P1, and a first ring gear R1. The first sun gear S1 is coupled to the transmission shaft 67. The plurality of first planet gears P1 mesh with the first sun gear S1 and are supported in a rotatable manner by the first carrier C1. A first carrier gear Gc1 is provided on an outer peripheral part of the first carrier C1. The first ring gear R1 meshes with the plurality of first planet gears P1 and is able to rotate. A first ring outer periphery gear Gr1 is provided on the outer periphery of the first ring gear R1.

The second planetary gear mechanism 69 has a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The Hi/Lo switch mechanism 70 is a mechanism for switching the driving power drivetrain of the power transmission device 24 between a high-speed mode (Hi mode) in which the vehicle speed is high and a low-speed mode (Lo mode) in which the vehicle speed is low. The Hi/Lo switch mechanism 70 has an H-clutch CH that is connected during the Hi mode and a L-clutch CL that is connected during the Lo mode. The H-clutch CH connects or disconnects the first ring gear R1 and the second carrier C2. The L-clutch CL connects or disconnects the second carrier C2 with a fixed end 72 to prohibit or allow the rotation of the second carrier C2.

The clutches CH and CL are hydraulic clutches, and hydraulic fluid from the transmission pump 29 is supplied to each of the clutches CH and CL. The hydraulic fluid for the H-clutch CH is controlled by an H-clutch control valve VH.

The hydraulic fluid for the L-clutch CL is controlled by an L-clutch control valve VL. The clutch control valves VH and VL are controlled by command signals from the control unit 27.

The first motor MG1 and the second motor MG2 function as drive motors that generate driving power using electrical energy. The first motor MG1 and the second motor MG2 also function as generators that use inputted driving power to generate electrical energy. The first motor MG1 functions as a generator when a command signal from the control unit 27 is applied to activate torque in the reverse direction of the rotating direction of the first motor MG1. A first motor gear Gm1 is fixed to the output shaft of the first motor MG1 and the first motor gear Gm1 meshes with the first carrier gear Gc1. A first inverter I1 is connected to the first motor MG1 and a command signal for controlling the motor torque of the first motor MG1 is applied to the first inverter I1 from the control unit 27.

The second motor MG2 is configured in the same way as the first motor MG1. A second motor gear Gm2 is fixed to the output shaft of the second motor MG2 and the second motor gear Gm2 meshes with the first ring outer periphery gear Gr1. A second inverter I2 is connected to the second motor MG2 and a command signal for controlling the motor torque of the second motor MG2 is applied to the second inverter I2 from the control unit 27.

The capacitor 64 functions as an energy reservoir unit for storing energy generated by the motors MG1 and MG2. That is, the capacitor 64 stores electrical power generated by the motors MG1 and MG2 when the total electrical power generation amount of the motors MG1 and MG2 is high. The capacitor 64 releases electrical power when the total electrical power consumption amount of the motors MG1 and MG2 is high. That is, the motors MG1 and MG2 are driven by electrical power stored in the capacitor 64. Alternatively, the motors MG1 and MG2 can drive using the electrical power stored in the capacitor 64. A battery may be used in place of a capacitor.

The control unit 27 receives detection signals from the various detecting units and applies command signals for indicating the command torques for the motors MG1 and MG2 to inverters I1 and I2. The control unit 27 may output rotation speed commands to the motors MG1 and MG2. In this case, the inverters I1 and I2 control the motors MG1 and MG2 by calculating command torques corresponding to the rotation speed commands. The control unit 27 also applies command signals for controlling the clutch hydraulic pressure of the clutches CF, CR, CH, and CL to the clutch control valves VF, VR, VH, and VL. As a result, the speed change ratio and the output torque of the power transmission device 24 are controlled. The following is an explanation of the operations of the power transmission device 24.

Figure 4:
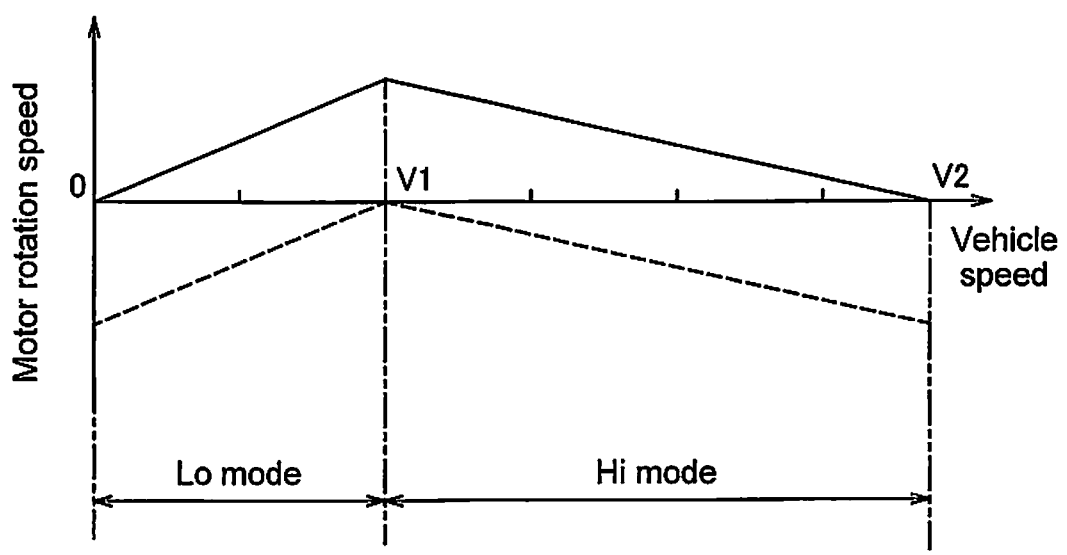
FIG. 4 illustrates changes in rotation speeds of a first motor and a second motor with respect to the vehicle speed.

An outline of operations of the power transmission device 24 when the vehicle speed increases from zero in the forward travel side while the rotation speed of the engine 21 remains fixed, will be explained with reference to FIG. 4. FIG. 4 illustrates the rotation speeds of the motors MG1 and MG2 with respect to the vehicle speed. When the rotation speed of the engine 21 is fixed, the vehicle speed changes in response to the rotation speed ratio of the power transmission device 24. The rotation speed ratio is the ratio of the rotation speed of the output shaft 63 with respect to the rotation speed of the input shaft 61. Therefore, the variation in the vehicle speed in FIG. 4 matches the variation of the rotation speed ratio of the power transmission device 24. That is, FIG. 4 illustrates the relationship between the rotation speeds of the motors MG1 and MG2 and the rotation speed ratio of the power transmission device 24. The solid line in FIG. 4 represents the rotation speed of the first motor MG1, and the dashed line represents the rotation speed of the second motor MG2.

The L-clutch CL is connected and the H-clutch CH is disconnected in the region in which the vehicle speed is between zero and V1 inclusive (Lo mode). Because the H-clutch CH is disconnected in the Lo mode, the second carrier C2 and the first ring gear R1 are disconnected. Because the L-clutch CL is connected, the second carrier C2 is fixed.

The driving power from the engine 21 in the Lo mode is inputted to the first sun gear S1 via the transmission shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. The second motor MG2 functions mainly as a generator in the Lo mode, and a portion of the electrical power generated by the second motor MG2 is stored in the capacitor 64. A portion of the electrical power generated by the second motor MG2 is consumed in the driving of the first motor MG1.

The first motor MG1 functions mainly as an electric motor in the Lo mode. The driving power of the first motor MG1 is outputted to the second sun gear S2 along a path from the first motor gear Gm1 to the first carrier gear Gc1 to the first carrier C1. The driving power outputted to the second sun gear S2 as described above is transmitted to the output shaft 63 along a path from the second planet gears P2 to the second ring gear R2 to the second ring outer periphery gear Gr2 to the output gear 71.

The H-clutch CH is connected and the L-clutch CL is disconnected in the region in which the vehicle speed exceeds V1 (Hi mode). Because the H-clutch CH is connected in the Hi mode, the second carrier C2 and the first ring gear R1 are connected. Because the L-clutch CL is disconnected, the second carrier C2 is disconnected. Therefore, the rotation speed of the first ring gear RI and the second carrier C2 match.

The driving power from the engine 21 in the Hi mode is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1. The first motor MG1 functions mainly as a generator in the Hi mode, and thus a portion of the electrical power generated by the first motor MG1 is stored in the capacitor 64. A portion of the electrical power generated by the first motor MG1 is consumed in the driving of the second motor MG2.

The driving power of the second motor MG2 is outputted to the second carrier C2 along a path from the second motor gear Gm2 to the first ring outer periphery gear Gr1 to the first ring gear R1 to the H-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power combined by the second ring gear R2 in this way is transmitted through the second ring outer periphery gear Gr2 and the output gear 71 to the output shaft 63.

While forward travel driving has been discussed above, the operations of reverse travel driving are similar. During braking, the roles of the first motor MG1 and the second motor MG2 as generator and motor are reversed from the above explanation.

The control of the power transmission device 24 by the control unit 27 is described in detail below. The control unit 27 controls the output torque of the power transmission device 24 by controlling the motor torque of the first motor MG1 and the second motor MG2. The control unit 27 controls the tractive force or the braking force of the work vehicle 1 by controlling the motor torques of the first motor MG1 and the second motor MG2.

A method for determining the command values (referred to below as "command torque") of the motor torques to the first motor MG1 and the second motor MG2 is explained below.

Figure 5:
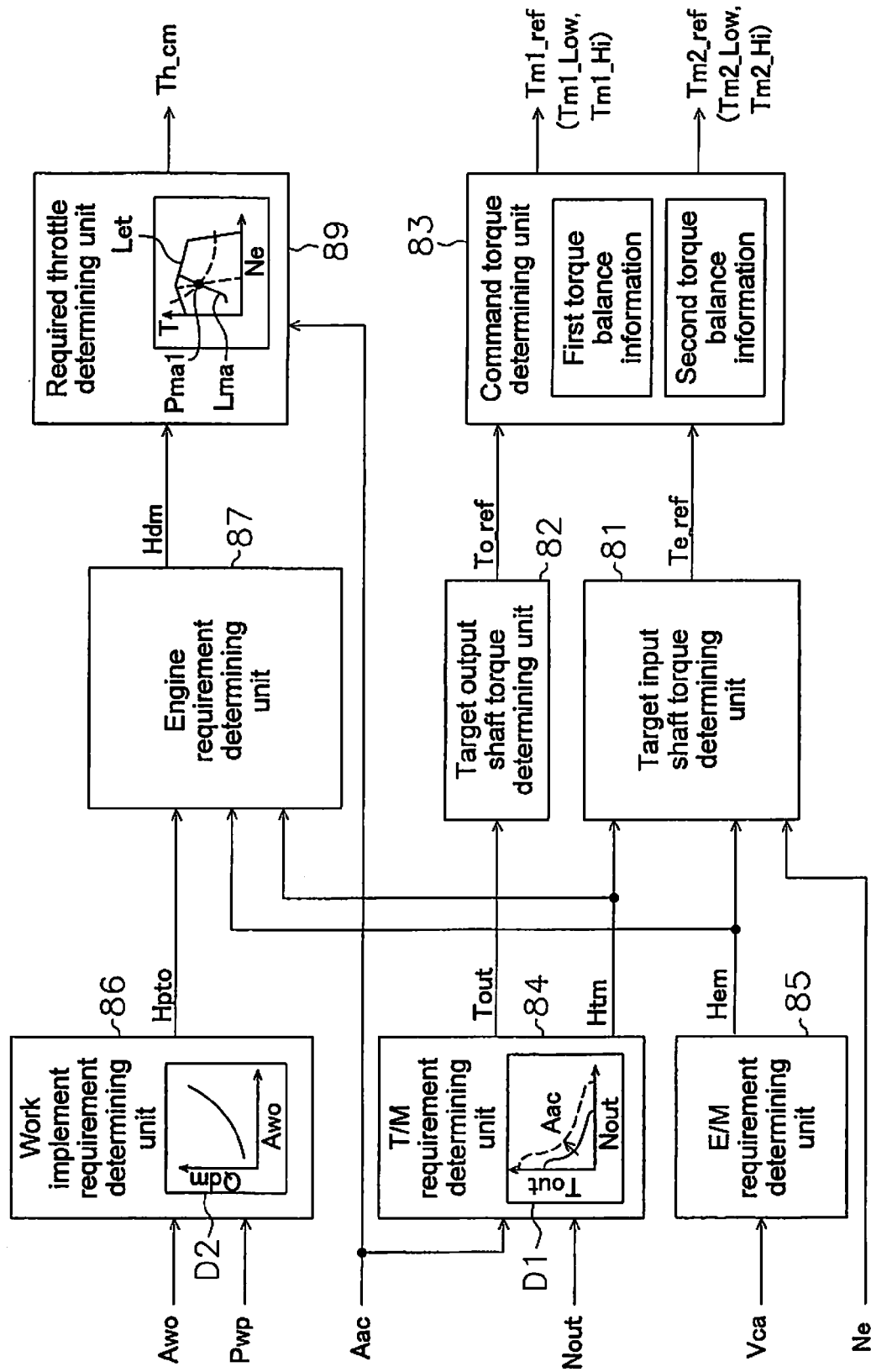
FIG. 5 is a block diagram illustrating a process for determining command torques for the motors.

FIG. 5 is a control block diagram illustrating processing executed by the control unit 27. The control unit 27 has a transmission requirement determining unit 84, an energy management requirement determining unit 85, and a work implement requirement determining unit 86 as illustrated in FIG. 5.

The transmission requirement determining unit 84 determines a required tractive force Tout on the basis of an accelerator operating amount Aac and an output rotation speed Nout. Specifically, the transmission requirement determining unit 84 determines the required tractive force Tout from the output rotation speed Nout on the basis of required tractive force characteristics information D1 stored in the storage unit 56. The required tractive force characteristics information D1 is data indicating the required tractive force characteristics for defining the relationship between the output rotation speed Nout and the required tractive force Tout. The required tractive force characteristics are changed in response to the accelerator operating amount. The required tractive force characteristics correspond to predetermined vehicle speed—tractive force characteristics. The transmission requirement determining unit 84 uses the required tractive force characteristics corresponding to the accelerator operating amount to determine the required tractive force Tout from the output rotation speed Nout and to determine a transmission required horsepower Htm that is a product of the output rotation speed Nout and the required tractive force Tout.

Figure 6:
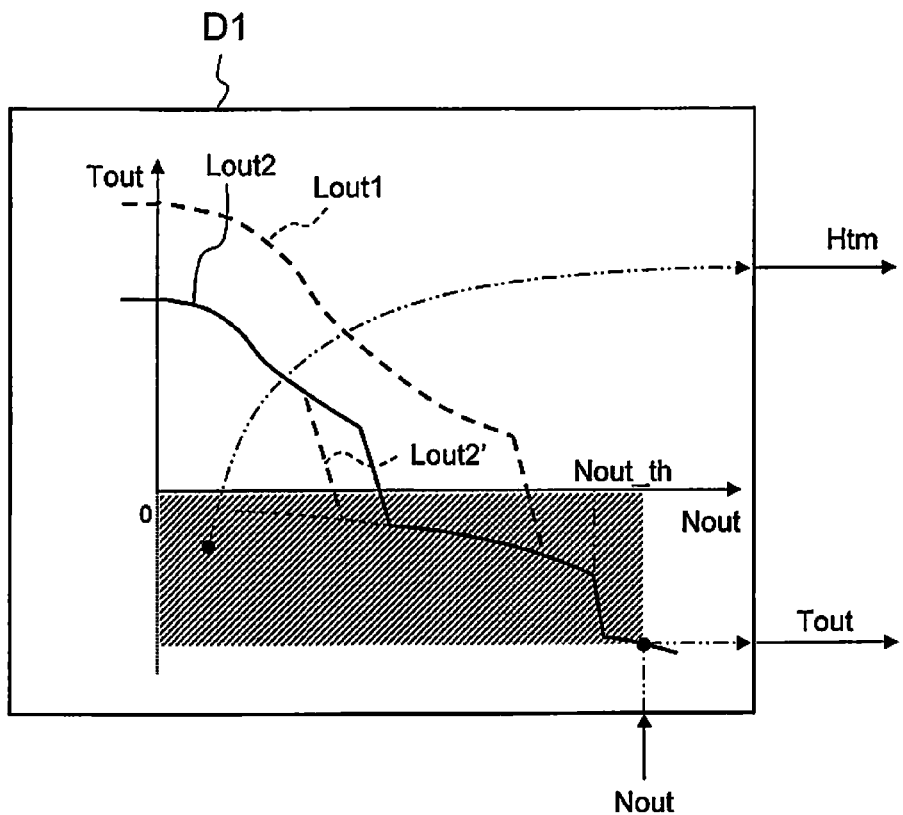
FIG. 6 is a graph illustrating an example of required tractive force characteristics.

Specifically as illustrated in FIG. 6, the storage unit 56 stores data Lout1 (referred to below as "basic tractive force characteristics Lout1") indicating basic required tractive force characteristics. The basic tractive force characteristics Lout1 are required tractive force characteristics when the accelerator operating amount Aac is at the maximum value, that is, at 100%. The basic tractive force characteristics Lout1 are determined in response to a speed range selected by the speed change operating member 53a. The transmission requirement determining unit 84 determines current required tractive force characteristics Lout2 by multiplying the basic tractive force characteristics Lout1 by a predetermined ratio corresponding to the accelerator operating amount Aac.

The required tractive force characteristics information D1 defines the required tractive force Tout that increases in response to a reduction in the output rotation speed Nout. When the above-mentioned speed change operating member 53a is operated, the transmission requirement determining unit 84 changes the required tractive force characteristics in response to the speed range selected by the speed change operating member 53a. For example, when a down-shift is performed using the speed change operating member 53a, the required tractive force characteristics information changes from Lout2 to Lout2'. As a result, the upper limit of the output rotation speed Nout is reduced. That is, the upper limit of the vehicle speed is reduced.

The required tractive force characteristics information D1 defines the required tractive force Tout as a negative value with respect to the output rotation speed Nout that is no less than the predetermined speed. As a result, the required tractive force Tout is determined to be a negative value when the output rotation speed Nout is larger than the upper limit of the output rotation speed in the selected speed range. A braking force is generated when the required tractive force Tout is a negative value. As a result, a behavior similar to engine brake generated in a torque converter-type speed change device is materialized in the EMT-type power transmission device 24. Control during braking by the engine brake is described below.

The energy management requirement determining unit 85 illustrated in FIG. 5 determines an energy management required horsepower Hem on the basis of a remaining amount of electrical power in the capacitor 64. The energy management required horsepower Hem is a horsepower required by the power transmission device 24 for charging the capacitor 64. For example, the energy management requirement determining unit 85 determines a current capacitor charge capacity from a voltage Vca of the capacitor 64. The energy management requirement determining unit 85 increases the energy management required horsepower Hem as the current capacitor charge capacity becomes smaller.

The work implement requirement determining unit 86 determines a work implement required horsepower Hpto on the basis of a work implement pump pressure Pwp and an operating amount Awo (referred to below as "work implement operating amount Awo") of the work implement operating member 52a. In the present exemplary embodiment, the work implement required horsepower Hpto is a horsepower distributed to the work implement pump 23. However, the work implement required horsepower Hpto may include a horsepower distributed to the steering pump 30 and/or the transmission pump 29.

Specifically, the work implement requirement determining unit 86 determines a required flow rate Qdm of the work implement pump 23 from the work implement operating amount Awo on the basis of required flow rate information D2. The required flow rate information D2 is stored in the storage unit 56 and defines the relationship between the required flow rate Qdm and the work implement operating amount Awo. The work implement requirement determining unit 86 determines the work implement required horsepower Hpto from the required flow rate Qdm and the work implement pump pressure Pwp.

The control unit 27 has a target output shaft torque determining unit 82, a target input shaft torque determining unit 81, and a command-torque determining unit 83.

The target output shaft torque determining unit 82 determines a target output shaft torque To_ref. The target output shaft torque To_ref is a target value for the torque to be outputted from the power transmission device 24. The target output shaft torque determining unit 82 determines the target output shaft torque To_ref on the basis of the required tractive force Tout determined by the transmission requirement determining unit 84. Specifically, the target output shaft torque To_ref is determined by multiplying the required tractive force Tout by a predetermined distribution ratio. The predetermined distribution ratio is set, for example, so that the total of the work implement required horsepower Hpto, the transmission required horsepower Htm, and the energy management required horsepower Hem does not exceed the output horsepower from the engine 21.

The target input shaft torque determining unit 81 determines a target input shaft torque Te_ref. The target input shaft torque Te_ref is a target value for the torque to be inputted to the power transmission device 24. The target input shaft torque determining unit 81 determines the target input shaft torque Te_ref on the basis of the transmission required horsepower Htm and the energy management required horsepower Hem. Specifically the target input shaft torque determining unit 81 calculates the target input shaft torque Te_ref by multiplying the engine rotation speed by the sum of the energy management required horsepower Hem and the value of the transmission required horsepower Htm multiplied by a predetermined distribution ratio. The transmission required horsepower Htm is calculated by multiplying the above-mentioned required tractive force Tout by the current output rotation speed Nout.

The command-torque determining unit 83 uses torque-balance information to determine respective command torques Tm1_ref and Tm2_ref for the motors MG1 and MG2 from the target input shaft torque Te_ref and the target output shaft torque To_ref. The torque-balance information defines a relationship between the target input shaft torque Te_ref and the target output shaft torque To_ref to achieve a balance among the torques of the power transmission device 24. The torque-balance information is stored in the storage unit 56.

As described above, the transmission paths of the driving power in the power transmission device 24 are different for the Lo mode and the Hi mode. As a result, the command-torque determining unit 83 uses different torque-balance information to determine the respective command torques Tm1_ref and Tm2_ref for the motors MG1 and MG2 in the Lo mode and the Hi mode. Specifically, the command-torque determining unit 83 uses first torque-balance information represented by equation 1 below to determine command torques Tm1_Low and Tm2_Low for the motors MG1 and MG2 in the Lo mode. In the present exemplary embodiment, the first torque-balance information is an equation for balancing the torques of the power transmission device 24.

$$Ts1\_Low = Te\_ref * r\_fr$$

$$Tc1\_Low = Ts1\_Low * (-1) * ((Zr1/Zs1)+1)$$

$$Tr2\_Low = To\_ref * (Zod/Zo)$$

$$Ts2\_Low = Tr2\_Low * (Zs2/Zr2)$$

$$Tcp1\_Low = Tc1\_Low + Ts2\_Low$$

$$Tm1\_Low = Tcp1\_Low * (-1) * (Zp1/Zp1d)$$

$$Tr1\_Low = Ts1\_Low * (Zr1/Zs1)$$

$$Tm2\_Low = Tr1\_Low * (-1) * (Zp2/Zp2d) \quad \text{Equation 1}$$

The command-torque determining unit 83 uses second torque-balance information represented by equation 2 below to determine command torques Tm1_Hi and Tm2_Hi for the motors MG1 and MG2 in the Hi mode. In the present exemplary embodiment, the second torque-balance information is an equation for balancing the torques of the power transmission device 24.

$$Ts1\_Hi = Te\_ref * r\_fr$$

$$Tc1\_Hi = Ts1\_Hi * (-1) * ((Zr1/Zs1)+1)$$

$$Tr2\_Hi = To\_ref * (Zod/Zo)$$

$$Ts2\_Hi = Tr2\_Hi * (Zs2/Zr2)$$

$$Tcp1\_Hi = Tc1\_Hi + Ts2\_Hi$$

$$Tm1\_Hi = Tcp1\_Hi * (-1) * (Zp1/Zp1d)$$

$$Tr1\_Hi = Ts1\_Hi * (Zr1/Zs1)$$

$$Tc2\_Hi = Tr2\_Hi * (-1) * ((Zs2/Zr2)+1)$$

$$Tcp2\_Hi = Tr1\_Hi + Tc2\_Hi$$

$$Tm2\_Hi = Tcp2\_Hi * (-1) * (Zp2/Zp2d) \quad \text{Equation 2}$$

The contents of the parameters in each torque-balance information are depicted in Table 1 below.

TABLE 1

| | |
|---|---|
| Te_ref | Target input shaft torque |
| To_ref | Target output shaft torque |
| r_fr | Deceleration ratio for the FR switch mechanism 65 (The FR switch mechanism 65 decelerates the engine rotation speed at 1/r_fr to output. When the FR switch mechanism 65 is in the forward travel state, r_fr is a negative value. When the FR switch mechanism 65 is in the reverse travel state, r_fr is a positive value.) |
| Zs1 | Number of teeth of the sun gear S1 in the first planetary gear mechanism 68. |
| Zr1 | Number of teeth of the ring gear R1 in the first planetary gear mechanism 68. |
| Zp1 | Number of teeth in the first carrier gear Gc1 |
| Zp1d | Number of teeth of the first motor gear Gm1 |
| Zs2 | Number of teeth of the sun gear S2 in the second planetary gear mechanism 69. |
| Zr2 | Number of teeth of the ring gear R2 in the second planetary gear mechanism 69. |
| Zp2 | Number of teeth of the first ring outer periphery gear Gr1 |
| Zp2d | Number of teeth of the second motor gear Gm2 |
| Zo | Number of teeth of the second ring outer periphery gear Gr2 |
| Zod | Number of teeth of the output gear 71 |

The control of the engine 21 by the control unit 27 is described in detail below. As described above, the control unit 27 controls the engine by transmitting command signals to the fuel injection device 28. A method for determining the command throttle values for the fuel injection device 28 will be explained below. The control unit 27 has an engine requirement determining unit 87 and a required throttle determining unit 89.

The engine requirement determining unit 87 determines an engine required horsepower Hdm on the basis of the work implement required horsepower Hpto, the transmission required horsepower Htm, and the energy management required horsepower Hem. Specifically, the engine requirement determining unit 87 determines the engine required horsepower Hdm by adding the work implement required horsepower Hpto, the transmission required horsepower Htm, and the energy management required horsepower Hem.

The required throttle determining unit 89 determines a command throttle value Th_cm from the engine required horsepower Hdm and the accelerator operating amount Aac. The required throttle determining unit 89 uses an engine torque line Let and a matching line Lma stored in the storage unit 56 to determine the command throttle value Th_cm. The engine torque line Let defines a relationship between the output torque of the engine 21 and the engine rotation speed Ne. The matching line Lma is information for determining a first required throttle value from the engine required horsepower Hdm.

The required throttle determining unit 89 determines the first required throttle value so that the engine torque line Let and the matching line Lma match at a matching point Pma1 where the output torque of the engine 21 becomes the torque corresponding to the engine required horsepower Hdm. The required throttle determining unit 89 determines the lowest value from the first required throttle value and a second required throttle value corresponding to the accelerator operating amount Aac as the command throttle value Th_cm.

Figure 7:
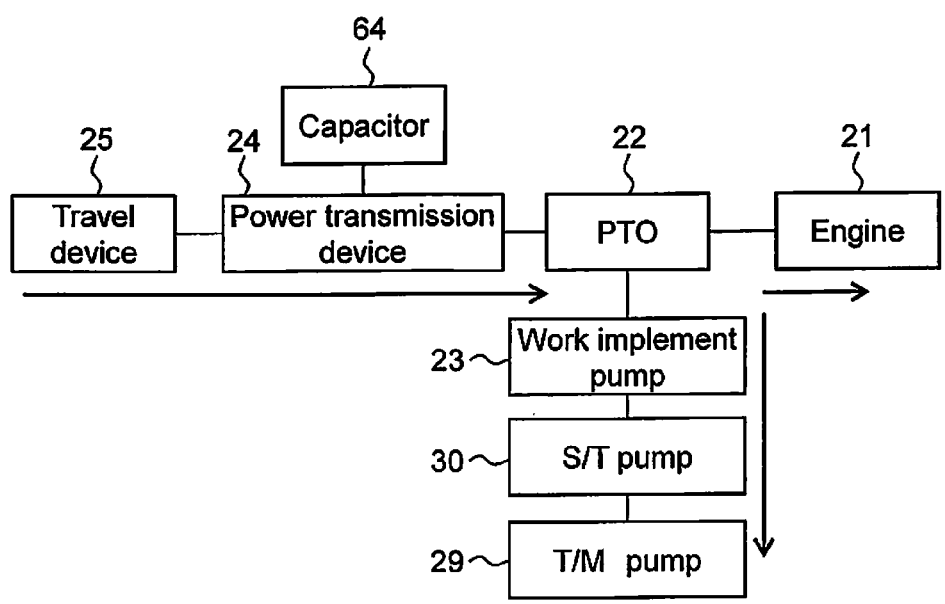
FIG. 7 is a schematic view illustrating the flow of braking power absorbed during braking.

Control during braking by the engine brake is described below. FIG. 7 is a schematic view illustrating the flow of braking power absorbed during braking. As illustrated in FIG. 7, a portion of the braking power absorbed by the travel device 25 is stored in the capacitor 64 as electrical energy due to the driving of the first motor MG1 and/or the second motor MG2. Portions of the braking power are distributed to the work implement pump 23, the steering pump 30, and the transmission pump 29 through the PTO 22.

Figure 8:
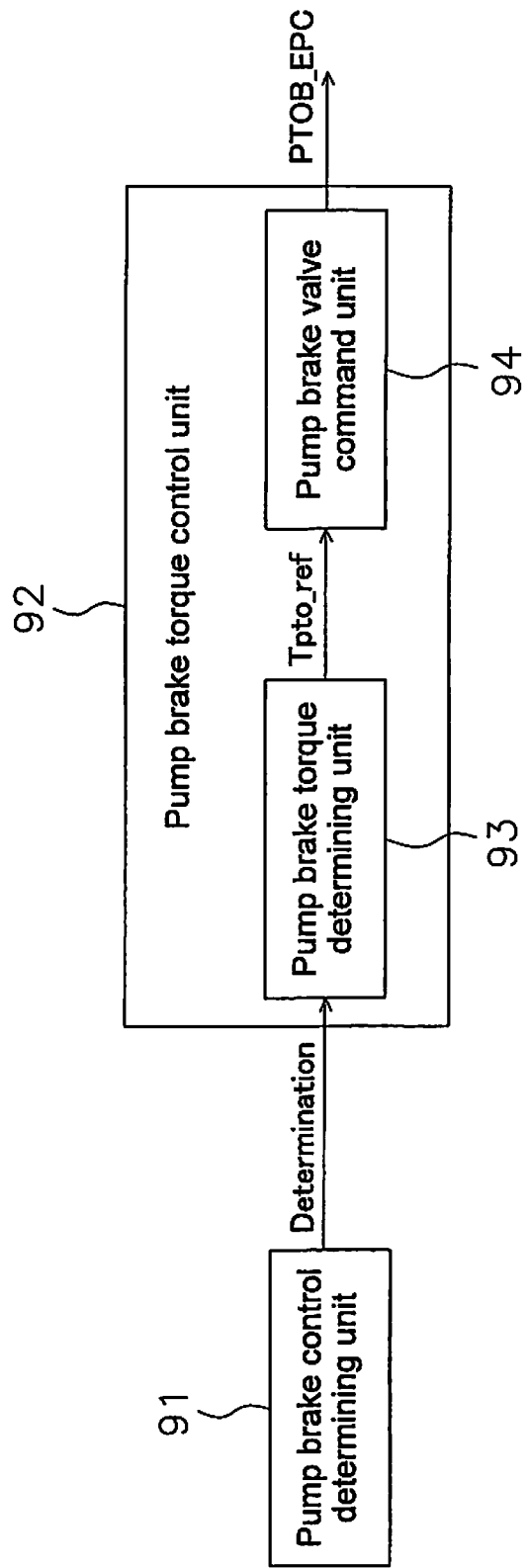
FIG. 8 is a control block diagram illustrating processing executed by the control unit during braking.

FIG. 8 is a control block diagram illustrating processing executed by the control unit 27 during braking. As illustrated in FIG. 8, the control unit 27 has a pump brake control determining unit 91 and a pump brake torque control unit 92. The pump brake control determining unit 91 determines whether to execute a pump brake control for causing a braking force to be generated by using a load on the work implement 23 during braking. The pump brake torque control unit 92 increases the pump brake torque by increasing the load on the work implement pump 23 during the pump brake control. The pump brake torque corresponds to a load on the work implement pump 23.

While the generation of the braking force occurs when the required tractive force Tout is a negative value as described above, an increase or decrease or a magnitude correlation of the braking force or the brake torque in the present exemplary embodiment signifies an increase or decrease or a magnitude correlation of the absolute values of the braking force or the brake torque. Other parameters mentioned below used in the control during braking such as the engine regenerative torque are similar.

Figure 9:
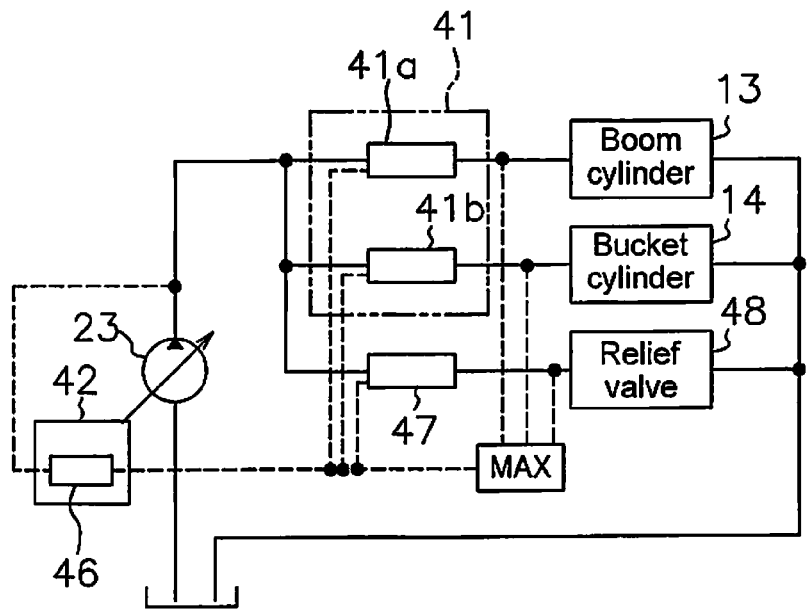
FIG. 9 is a schematic view illustrating a hydraulic circuit connected to the work implement pump.

FIG. 9 is a schematic view illustrating a hydraulic circuit connected to the work implement pump 23. As illustrated in FIG. 9, the above-mentioned work implement control valve 41 has a boom control valve 41*a* and a bucket control valve 41*b*. The boom control valve 41*a* controls the hydraulic fluid supplied to the lift cylinder 13. The bucket control valve 41*b* controls the hydraulic fluid supplied to the bucket cylinder 14.

The hydraulic circuit connected to the work implement pump 23 has a pump brake control valve 47 and a relief valve 48. The work implement pump 23 is connected to the relief valve 48 through the pump brake control valve 47. The relief valve 48 is provided parallel to the lift cylinder 13 and the bucket cylinder 14 in the hydraulic circuit. The pump brake control valve 47 controls the hydraulic fluid supplied to the relief valve 48. The pump brake control valve 47 is an electromagnetic control valve and controls the hydraulic fluid supplied to the relief valve 48 on the basis of a command signal inputted from the pump brake torque control unit 92. The pump brake torque control unit 92 increases the load on the work implement pump 23 by controlling the pump brake control valve 47.

The first capacity control device 42 has a load sensing valve 46 (referred to below as "LS valve 46"). The LS valve 46 controls the discharge flow rate of the work implement pump 23 so that a differential pressure between the discharge pressure of the work implement pump 23 and the outlet oil pressures of the boom control valve 41*a*, the bucket control valve 41*b*, and the pump brake control valve 47 meets a predetermined value. Specifically, the largest outlet oil pressure (referred to below as "LS pressure") among the outlet oil pressure of the boom control valve 41*a*, the outlet oil pressure of the bucket control valve 41*b*, and the outlet oil pressure of the pump brake control valve 47 is inputted into the LS valve 46. The LS valve 46 controls the discharge capacity of the work implement pump 23 so that a differential pressure between the discharge pressure of the work implement pump 23 and the LS pressure satisfies a predetermined value. The boom control valve 41*a*, the bucket control valve 41*b*, and the pump brake control valve 47 are each provided with a pressure-compensated valve, which is not illustrated, on the inlet side. The pressure-compensated valves generate a pressure difference that corresponds to the differential pressure between the outlet pressures and the LS pressure. The dashed lines connected to the left sides of the boom control valve 41*a*, the bucket control valve 41*b*, and the pump brake control valve 47 in FIG. 9 indicate the input of the LS pressure into the control valves 41*a*, 41*b*, and 47 for pressure compensation. The discharge flow rate of the work implement pump 23 is controlled in response to command signals from the control unit 27 due to the control of the boom control valve 41*a*, the bucket control valve 41*b*, and the pump brake control valve 47.

Figure 10:
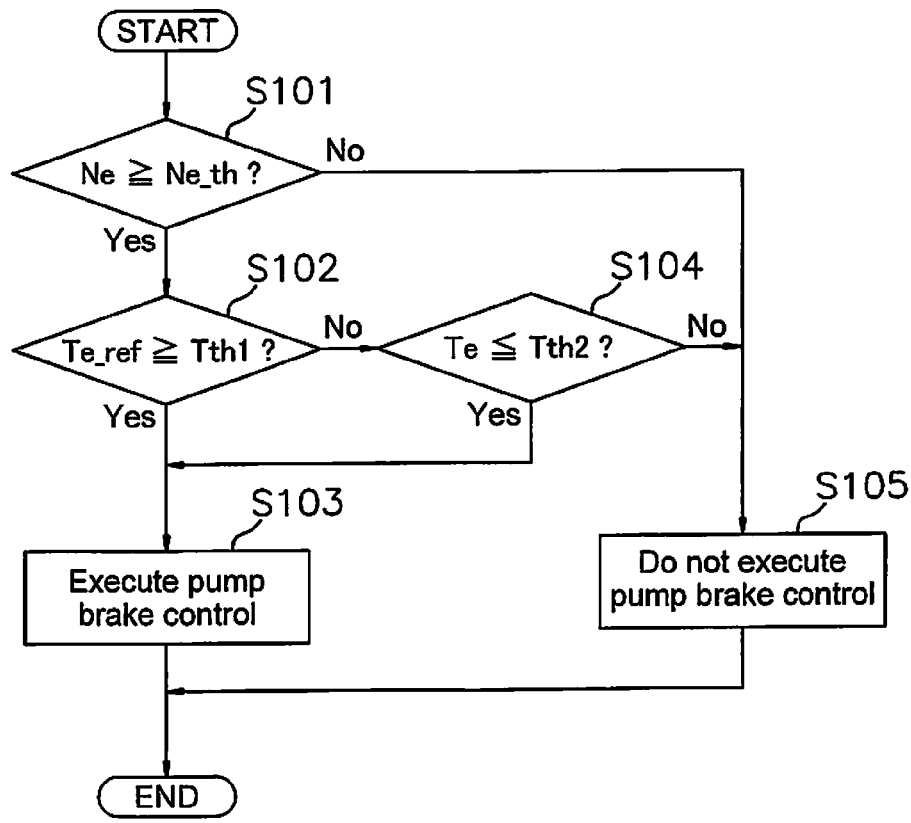
FIG. 10 is a flow chart of processing to determine the execution of pump brake control.

FIG. 10 is a flow chart illustrating processing to determine whether to execute a pump brake control by the pump brake control determining unit 91. First in step S101, a determination is made as to whether the engine rotation speed Ne is equal to or greater than a predetermined rotation speed threshold Ne_th. When the engine rotation speed Ne is equal to or greater than the predetermined rotation speed threshold Ne_th, the routine advances to step S102.

In step S102, a determination is made as to whether the engine regenerative torque Te_ref is equal to or greater than a predetermined regenerative torque threshold Tth1. The engine regenerative torque. Te_ref corresponds to the above-mentioned target input shaft torque Te_ref and is a torque regenerated in the engine 21 from the travel device 25 during braking via the power transmission device 24.

$$Te\_ref=(Htm-Hem)/Nout \qquad \text{Equation 3}$$

Htm is the above-mentioned transmission required horsepower. When the required tractive force Tout is determined to be a negative value, the required tractive force Tout corresponds to a target braking force that is a target value of the braking force absorbed by the output shaft 63 of the power transmission device 24 during braking due to engine brake. In this case, Htm corresponds to a target braking power that is a target value of the braking power absorbed by the output shaft 63 of the power transmission device 24 during braking. Therefore, the work implement requirement determining unit 86 functions as a target braking power determining unit for determining the target braking power Htm during braking due to engine brake. The Htm may be multiplied by a predetermined efficiency in the above equation 3.

The Hem is the above-mentioned energy management required horsepower and corresponds to a charge power of the capacitor 64. Therefore, the energy management requirement determining unit 85 functions as a reservoir power computing unit for computing reservoir power during braking due to the engine brake.

When the engine regenerative torque Te_ref is equal to or greater than the predetermined regenerative torque threshold Tth1 in step S102, a determination is made in step S103 to execute the pump brake control.

When the engine regenerative torque Te_ref is not equal to or greater than the predetermined regenerative torque threshold Tth1 in step S102, the routine advances to step S104. In step S104, a determination is made as to whether an engine output torque Te is equal to or less than a predetermined output torque threshold Tth2. The engine output torque Te may be an estimated value or a command value. For example, the engine output torque Te may be computed from the command throttle value Th_cm for the engine. When the engine output torque Te is equal to or less than the predetermined output torque threshold Tth2, a determination is made in step S103 to execute the pump brake control.

When the engine rotation speed Ne is not equal to or greater than the predetermined rotation speed threshold Ne_th in step S101, a determination is made in step S105 to not execute the pump brake control. Moreover, when the engine output torque Te is not equal to or less than the predetermined output torque threshold Tth2 in step S104, a determination is made in step S105 to not execute the pump brake control.

As described above, when the engine rotation speed Ne is equal to or greater than the predetermined rotation speed threshold Ne_th and the engine regenerative torque Te_ref is equal to or greater than the predetermined regenerative torque threshold Tth1, a determination is made by the pump brake control determining unit 91 to execute the pump brake control. When the engine rotation speed Ne is equal to or greater than the predetermined rotation speed threshold Ne_th and the engine output torque Te is equal to or less than the predetermined output torque threshold Tth2, a determination is made by the pump brake control determining unit 91 to execute the pump brake control.

The pump brake torque control unit 92 increases the load on the work implement pump 23 by controlling the pump brake control valve 47 when executing the pump brake control. When the pump brake control is not executed, the pump brake torque control unit 92 does not increase the load on the work implement pump 23. That is, a below-mentioned pump brake torque Tpto_ref is zero. Next, the control method of the pump brake control valve 47 will be explained in detail. As illustrated in FIG. 8, the pump brake torque control unit 92 has a pump brake torque determining unit 93 and a pump brake valve command unit 94.

Figure 11:
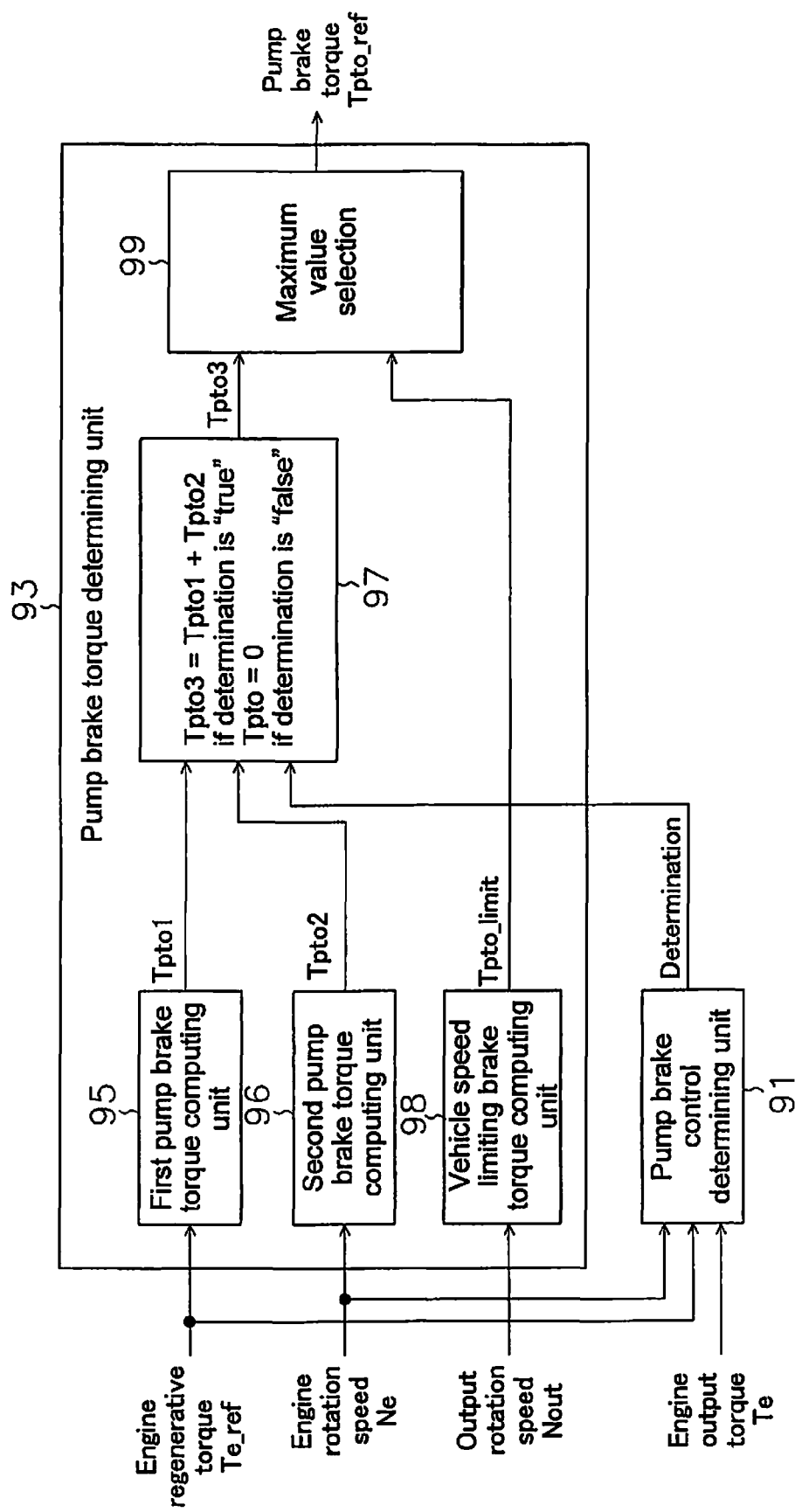
FIG. 11 is a block diagram illustrating a process for determining a pump brake torque.

The pump brake torque determining unit 93 determines the pump brake torque Tpto_ref. The pump brake torque Tpto_ref is a pump brake torque converted to the output shaft of the engine 21, and is a total value of the load torques generated by the work implement pump 23, the steering pump 30, the transmission pump 29, and by another compensator, which is not illustrated, during braking due to the pump brake control. FIG. 11 is a control block diagram illustrating processing to determine the pump brake torque Tpto_ref by the pump brake torque determining unit 93. As illustrated in FIG. 11, the pump brake torque control unit 92 has a first pump brake torque computing unit 95, a second pump brake torque computing unit 96, a third pump brake torque computing unit 97, a vehicle speed limiting brake torque computing unit 98, and a maximum value selecting unit 99.

The first pump brake torque computing unit 95 computes a first pump brake torque Tpto1 on the basis of the engine regenerative torque Te_ref. Specifically, the first pump brake torque computing unit 95 computes the first pump brake torque Tpto1 using the following equation 4.

$$Tpto1 = (Te\_ref - Te\_loss) * k1 \quad \text{Equation 4}$$

Te_loss signifies an engine loss and corresponds to the braking power that can be absorbed in the engine 21. The engine loss Te_loss may be a fixed value. Alternatively, the engine loss Te_loss may be determined from the engine rotation speed Ne by using a table or an equation etc. in which k1 is a predetermined coefficient greater than zero and less than one. Upper and lower limits of the first pump brake torque Tpto1 may be set.

The second pump brake torque computing unit 96 computes a second pump brake torque Tpto2 on the basis of the engine rotation speed Ne. Specifically, the second pump brake torque computing unit 96 computes the second pump brake torque Tpto2 using the following equation 5.

$$\Delta Ne = Ne - Ne\_target$$

$$Tpto2 = kp \Delta Ne + ki \int \Delta Ne \, dt$$

Ne_target is a target engine rotation speed during the pump brake control. The target engine rotation speed Ne_target may be a fixed value. Alternatively, the target engine rotation speed Ne_target may be determined from the vehicle speed using a table or an equation etc. in which kp is a P-gain used in a PI control and ki is an I-gain used in a PI control. Upper and lower limits of the second pump brake torque Tpto2 may be set. The upper limit and/or the lower limit may be set to the integration term $\int (\Delta Ne) dt$. The integration is preferably reset at the start of the pump brake control and performed from zero.

The third pump brake torque computing unit 97 computes a third pump brake torque Tpto3 by adding the first pump brake torque Tpto1 and the second pump brake torque Tpto2 when the determination by the pump brake control determining unit 91 is "true," that is, when it is determined that the pump brake control is to be executed. Therefore, the pump brake torque control unit 92 determines the pump brake torque on the basis of the engine regenerative torque and determines the pump brake torque through feedback control by controlling the engine rotation speed Ne to meet the target engine rotation speed Ne_target.

The third pump brake torque computing unit 97 sets the third pump brake torque Tpto3 to zero when the determination by the pump brake control determining unit 91 is "false," that is, when it is determined that the pump brake control is not to be executed.

The vehicle speed limiting brake torque computing unit 98 computes a vehicle speed limit brake torque Tpto_limit on the basis of the vehicle speed. Specifically, the vehicle speed limiting brake torque computing unit 98 refers to vehicle speed limit brake torque information to determine the vehicle speed limit brake torque Tpto_limit from the output rotation speed Nout. For example, the vehicle speed limit brake torque information is a table for defining the relationship between the output rotation speed Nout and the vehicle speed limit brake torque Tpto_limit.

Figure 12:
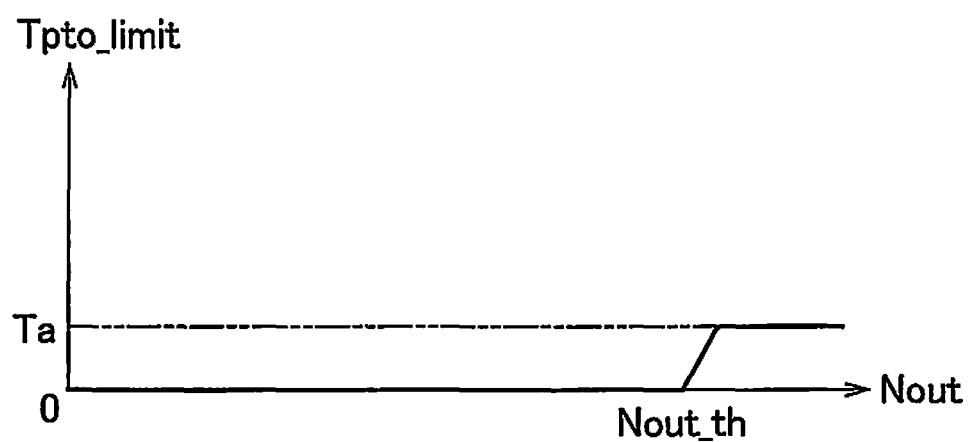
FIG. 12 is a graph of an example of vehicle speed limit brake torque information.

FIG. 12 is a graph illustrating the relationship between the output rotation speed Nout and the vehicle speed limit brake torque Tpto_limit defined by the vehicle speed limit brake torque information. As illustrated in FIG. 12, when the output rotation speed Nout is equal to or greater than zero and less than a predetermined speed threshold Nout_th, the vehicle speed limit brake torque information indicates that the vehicle speed limit brake torque Tpto_limit is zero. When the output rotation speed Nout is equal to or greater than the predetermined speed threshold Nout_th, the vehicle speed limit brake torque Tpto_limit becomes a predetermined value Ta.

The maximum value selecting unit 99 determines a pump brake torque Tpto_ref from the largest of the third pump brake torque Tpto3 and the vehicle speed limit brake torque Tpto_limit. Therefore, when a determination is made to execute the pump brake control, the third pump brake torque Tpto3 becomes the pump brake torque Tpto_ref when the output rotation speed Nout is less than the predetermined speed threshold Nout_th. In this case, the pump brake torque control unit 92 determines the pump brake torque Tpto_ref on the basis of the engine regenerative torque Te_ref and controls the pump brake torque Tpto_ref so that the engine rotation speed Ne becomes the target engine rotation speed Ne_target.

The vehicle speed limit brake torque Tpto_limit becomes the pump brake torque Tpto_ref when it is determined that the pump brake control is to be executed, the output rotation speed Nout is equal to or greater than the predetermined speed threshold Nout_th, and the vehicle speed limit brake torque Tpto_limit is greater than the third pump brake torque Tpto3. Therefore, the pump brake torque control unit 92 increases the pump brake torque Tpto_ref when the output rotation speed Nout meets or exceeds the speed threshold Nout_th. That is, the pump brake torque control unit 92 increases the pump brake torque Tpto_ref when the vehicle speed meets or exceeds the predetermined vehicle speed threshold corresponding to the speed threshold Nout_th. As a result, the target braking force Tout increases when the output rotation speed Nout is equal to or greater than the predetermined speed threshold Nout_th, and the pump brake torque Tpto_ref can be increased as illustrated in FIG. 6. As a result, an excessive rise in the engine rotation speed can be suppressed.

When it is determined that the pump brake control is not to be executed, the third pump brake torque Tpto3 is zero. Moreover, when the output rotation speed Nout is less than the predetermined speed threshold Nout_th, the vehicle speed limit brake torque Tpto_limit is zero. As a result, the pump brake torque Tpto_ref is zero and the pump brake torque control unit 92 does not generate pump brake torque.

However, even when it is determined that the pump brake control is not to be executed, the pump brake torque Tpto_ref meets the predetermined value Ta when the output rotation speed Nout is equal to or greater than the predetermined speed threshold Nout_th. Therefore, even if it is determined that the pump brake control is not to be executed, an excessive rise in the engine rotation speed is suppressed due to the generation of the pump brake torque when the output rotation speed Nout is large.

Figure 13:
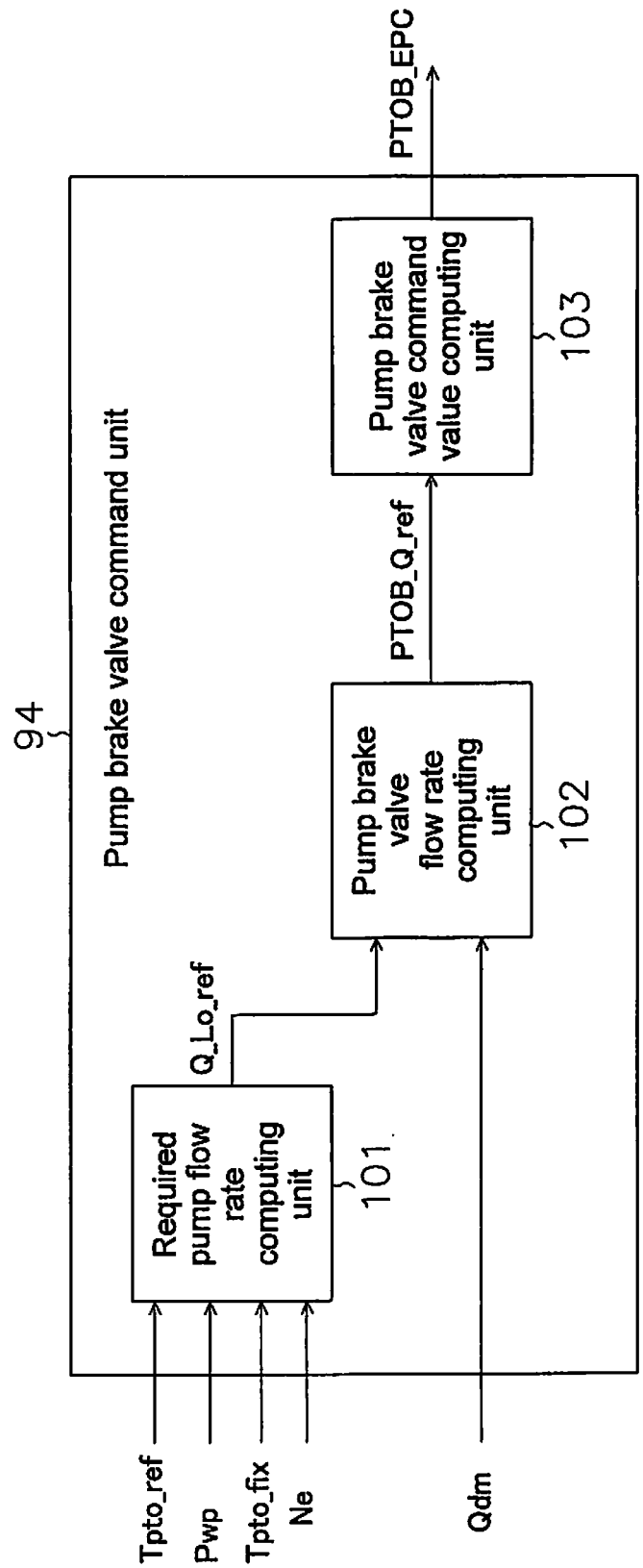
FIG. 13 is a control block diagram illustrating processing to determine a command value for the pump brake control valve.

The pump brake valve command unit 94 illustrated in FIG. 8 determines a command value PTOB_EPC for the pump brake control valve 47 on the basis of the pump brake torque Tpto_ref. The pump brake control valve 47 as described above is an electromagnetic control valve and the command value PTOB_EPC for the pump brake control valve 47 is a command current value. FIG. 13 is a control block diagram illustrating processing by the pump brake valve command unit 94 to determine the command value PTOB_EPC for the pump brake control valve 47. As illustrated in FIG. 13, the pump brake valve command unit 94 has a required pump flow rate computing unit 101, a pump brake valve flow rate computing unit 102, and a pump brake valve command value computing unit 103.

The required pump flow rate computing unit 101 determines a required flow rate Q_Lo_ref of the work implement pump 23 on the basis of the pump brake torque Tpto_ref. Specifically, the required pump flow rate computing unit 101 uses the following equation 6 to determine the required flow rate Q_Lo_ref of the work implement pump 23.

$$Q\_Lo\_ref=((Tpto\_ref-Tpto\_fix)/Pwp)*Ne \qquad \text{Equation 6}$$

Tpto_fix is a fixed load for an output shaft conversion of the engine 21 and is a load which does not involve adjustments for controlling the braking force. For example, Tpto_fix is the sum of the load torque of the steering pump 30, the load torque of the transmission pump 29, and the load torque from a compensator which is not illustrated. Pwp is the above-mentioned work implement pump pressure.

The pump brake valve flow rate computing unit 102 computes a pump brake valve flow rate PTOB_Q_ref. The pump brake valve flow rate PTOB_Q_ref is the flow rate of the pump brake control valve 47. Specifically, the pump brake valve flow rate computing unit 102 uses the following equation 7 to compute the pump brake valve flow rate PTOB_Q_ref.

$$PTOB\_Q\_ref=Q\_Lo\_ref-Qdm \qquad \text{Equation 7}$$

Qdm is the above-mentioned required flow rate of the work implement pump 23. That is, the pump brake torque control unit 92 determines the pump brake valve flow rate PTOB_Q_ref on the basis of the required flow rate Q_Lo_ref of the work implement pump 23 for obtaining the pump brake torque Tpto_ref, and the required flow rate Qdm of the work implement pump 23 for driving the work implement 3.

The pump brake valve command value computing unit 103 determines a pump brake valve command value PTOB_EPC on the basis of the pump brake valve flow rate PTOB_Q_ref. For example, the pump brake valve command value computing unit 103 refers to a table for defining the relationship between the pump brake valve flow rate PTOB_Q_ref and the pump brake valve command value PTOB_EPC to determine the pump brake valve command value PTOB_EPC from the pump brake valve flow rate PTOB_Q_ref.

When the pump brake valve command value PTOB_EPC is outputted from the pump brake torque control unit 92 to the pump brake control valve 47, the displacement volume of the work implement pump 23 is increased by the first capacity control device 42 due to the action of the LS valve 46. As a result, torque generated by the work implement pump 23 can be increased and the pump brake torque can be increased. In the hydraulic circuit illustrated in FIG. 9, the discharge pressure of the work implement pump 23 is maintained at or above the LS pressure and the required pump brake torque can be generated even when the work implement control valve 41 operates at the same time as the pump brake control valve 47 due to the action of the LS valve 46 and the pressure-compensated valve which is not illustrated.

The work vehicle according to the present exemplary embodiment has the following features.

The pump brake torque control unit 92 increases the pump brake torque by increasing the load on the work implement pump 23 when the pump brake control determining unit 91 determines that the pump brake control is to be executed during braking. As a result, a large braking force can be obtained while suppressing an excessive rise in the engine rotation speed during braking by increasing the braking power distributed to the work implement pump 23 by the PTO 22.

When the engine regenerative torque is equal to or greater than the predetermined regenerative torque threshold Tth1, the pump brake control determining unit 91 determines that the pump brake control is to be executed. Therefore, the pump brake torque can be increased when an engine regenerative torque that is larger than the torque that can be absorbed by the engine is generated, whereby an excessive rise in the engine rotation speed can be suppressed.

When the engine rotation speed is equal to or greater than the predetermined rotation speed threshold Ne_th, the pump brake control determining unit 91 determines that the pump brake control is to be executed. As a result, an excessive rise in the engine rotation speed can be suppressed.

The pump brake torque control unit 92 determines the pump brake torque on the basis of the engine regenerative torque. As a result, the pump brake torque can be appropriately controlled in response to the magnitude of the engine regenerative torque.

The pump brake torque control unit 92 determines the engine regenerative torque by subtracting the reservoir power from the target braking power. Because the target braking power is defined by the required tractive force characteristics information D1, the braking force can be appropriately controlled on the basis of the required tractive force characteristics information D1. When the reservoir power is subtracted from the target braking power, electrical power charged by the capacitor 64 can be ensured.

The pump brake torque control unit 92 determines the pump brake torque so that the engine rotation speed meets the target engine rotation speed during the pump brake control. As a result, an excessive rise in the engine rotation speed can be suppressed.

The pump brake torque control unit 92 increases the pump brake torque by determining the vehicle speed limit brake torque as the predetermined value Ta when the vehicle speed is equal to or greater than the predetermined vehicle speed threshold. Consequently, the braking force can be increased when the vehicle speed is equal to or greater than the predetermined vehicle speed threshold. As a result, an excessive rise in the vehicle speed can be prevented.

The pump brake torque control unit 92 increases the load on the work implement pump 23 by controlling the pump brake control valve 47. Therefore, a gain in the load on the work implement pump 23 is discarded as heat of the hydraulic fluid in the relief valve 48. As a result, the load on the work implement pump 23 can be increased while suppressing any adverse effects on the operation of the work implement 3.

The pump brake torque control unit 92 determines the pump brake valve flow rate PTOB_Q_ref on the basis of the required flow rate Q_Lo_ref of the work implement pump 23 and the required flow rate Qdm of the work implement pump 23. As a result, the required flow rate Qdm required for the operation of the work implement 3 can be ensured. Consequently, the braking force can be increased while supplying required hydraulic fluid to the work implement 3. Moreover, the flow rate of the pump brake control valve 47 can be suppressed by considering the deficient portion of the required flow rate Qdm as the pump brake valve flow rate PTOB_Q_ref in order to obtain the required flow rate Q_Lo_ref for the work implement pump 23. As a result, an excessive rise in the temperature of the hydraulic fluid can be suppressed. Consequently, an increase in the braking force due to the load on the work implement pump 23 can be carried out over a long period of time.

The present invention is not limited to the above exemplary embodiments and various changes and modifications may be made without departing from the spirit of the invention.

The present invention is not limited to the above-mentioned wheel loader and may be applied to another type of work vehicle such as a bulldozer, a tractor, a forklift, or a motor grader.

The present invention may be applicable to another type of speed change device, such as an HMT, without being limited to the EMT. In this case, the first motor MG1 functions as a hydraulic motor and a hydraulic pump. The second motor MG2 functions as a hydraulic motor and a hydraulic pump. The first motor MG1 and the second motor MG2 are variable displacement pump/motors, and the capacities are controlled by the control unit 27 controlling the tilt angle of the skew plate or the inclined shaft. The capacities of the first motor MG1 and the second motor MG2 are controlled so that the command torques Tm1_ref and Tm2_ref calculated in the same way as in the above exemplary embodiments are outputted.

The configuration of the power transmission device 24 is not limited to the configuration of the above exemplary embodiments. For example, the coupling and disposition of the elements of the two planetary gear mechanisms 68 and 69 are not limited to the coupling and disposition of the above exemplary embodiments. Moreover, the number of the planetary gear mechanisms provided in the power transmission device 24 is not limited to two. The power transmission device 24 may only have one planetary gear mechanism. Alternatively, the power transmission device 24 may have three or more planetary gear mechanisms.

The control of the power transmission device 24 is not limited to the control of the above exemplary embodiment. That is in the present exemplary embodiment, the target input shaft torque Te_ref and the target output shaft torque To_ref are determined so that predetermined vehicle speed—tractive force characteristics can be achieved in which the tractive force changes continuously in response to the vehicle speed. However, the target input shaft torque Te_ref and the target output shaft torque To_ref may be set optionally.

The torque-balance information is not limited to the equations for balancing the torque as in the above exemplary embodiment. For example, the torque-balance information may be in the format of a table or a map.

The pump brake torque is generated by increasing the load on the work implement pump 23 in the above exemplary embodiment. However, the pump brake torque may be generated by increasing the load on a hydraulic pump other than the work implement pump 23. While the operation of the pump brake control has been explained with reference to FIG. 9, the operation of the pump brake control is not limited to this method. That is, either a flow rate discharged from a hydraulic pump or a relief pressure of a relief valve, or both may be controlled in a hydraulic circuit provided with a hydraulic pump connected to the engine shaft or the PTO and a relief valve from which hydraulic fluid discharged from the hydraulic pump is relieved. For example, the hydraulic pump may be a fixed displacement pump and the relief valve may be a variable relief valve. Alternatively, the hydraulic pump may be a variable displacement pump and the relief valve may be a variable relief valve or a fixed relief valve.

Figure 14:
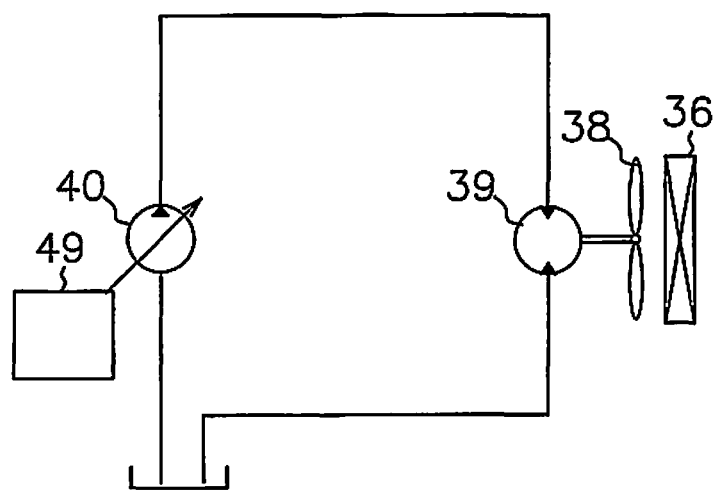
FIG. 14 is a schematic view of a portion of the hydraulic circuit provided in the work vehicle according to a first modified example.

For example, FIG. 14 is a schematic view illustrating a portion of a hydraulic circuit provided in a work vehicle according to a first modified example. As illustrated in FIG. 14, the work vehicle according to the first modified example is equipped with a radiator 36, a cooling fan 38, a fan motor 39, and a fan pump 40. The cooling liquid for the engine 21 flows in the radiator 36. The cooling fan 38 cools the cooling water in the radiator 36. The fan motor 39 is a hydraulic motor and drives the cooling fan 38. The fan pump 40 is a hydraulic pump and discharges hydraulic fluid for driving the fan motor 39. The fan pump 40 is connected to the engine 21 via the PTO 22 in the same way as the above-mentioned work implement pump 23. The fan pump 40 is a variable displacement pump and a third capacity control device 49 is connected to the fan pump 40. The third capacity control device 49 is controlled by the control unit 27 and changes the tilt angle of the fan pump 40. As a result, the discharge capacity of the fan pump 40 is controlled by the control unit 27. Other configurations of the work vehicle according to the first modified example are the same as those of the work vehicle 1 according to the above exemplary embodiment.

The pump brake torque control unit 92 increases the load on the fan pump 40 by increasing the discharge capacity of the fan pump 40 and increasing the rotation speed of the fan motor 39. In this case, the pump brake torque can be increased by increasing the load on the fan pump 40.

Figure 15:
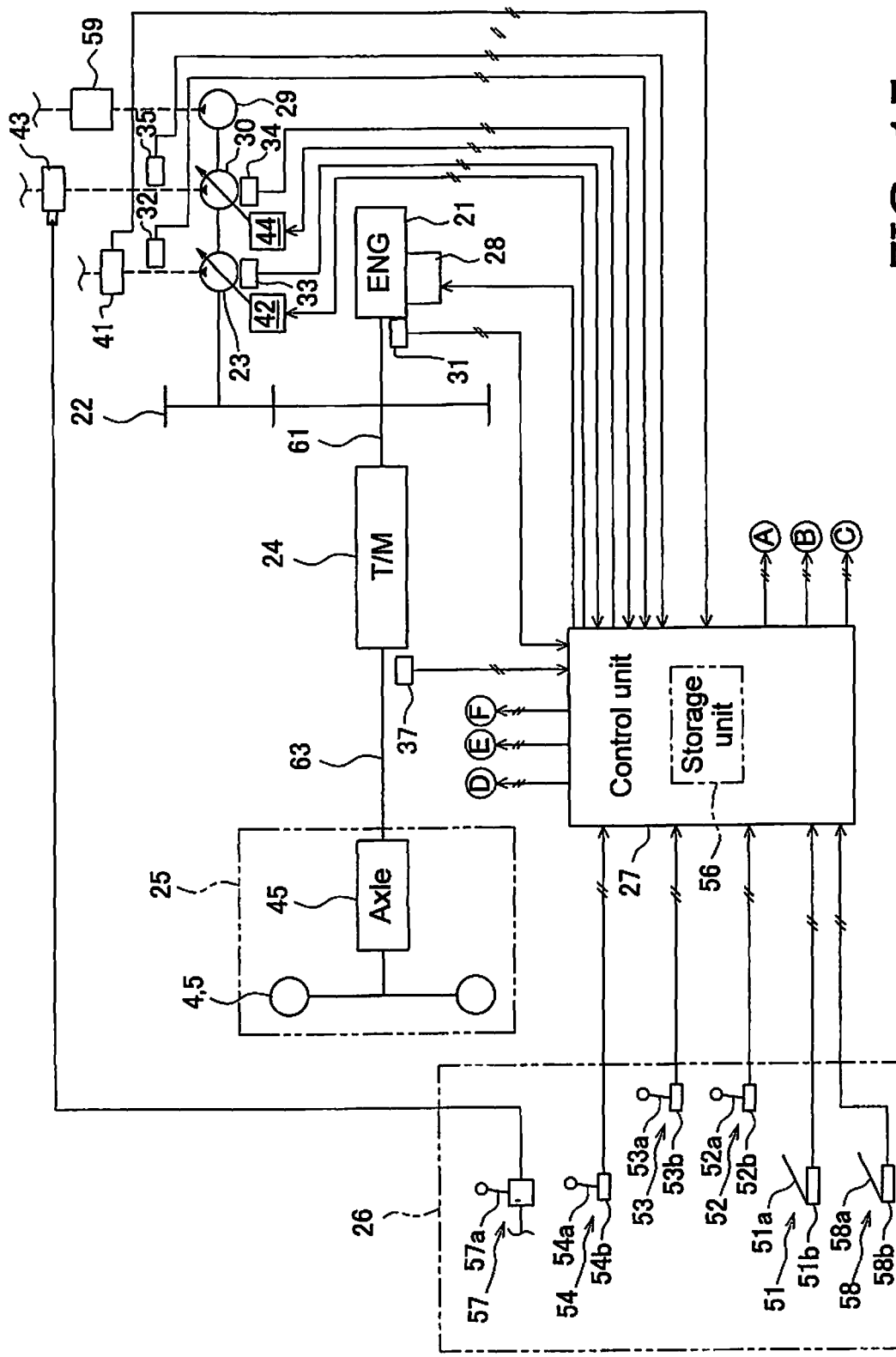
FIG. 15 is a schematic view of a configuration of the work vehicle according to a second modified example.

FIG. 15 is a schematic view of a configuration of the work vehicle according to a second modified example. As illustrated in FIG. 15, the work vehicle is equipped with a warm-up hydraulic circuit 59. The warm-up hydraulic circuit 59 is connected to the above-mentioned transmission pump 29. The warm-up hydraulic circuit 59 has, for example, a warm-up relief valve, and the control unit 27 increases the discharge pressure of the pump 29 by controlling the opening degree of the warm-up relief valve and increases the temperature of the hydraulic fluid passing through the warm-up relief valve. As a result, a warm-up operation is carried out by the warm-up hydraulic circuit 59. Other configurations of the work vehicle according to the second modified example are the same as those of the work vehicle 1 according to the above exemplary embodiment.

The pump brake torque control unit 92 increases the load on the transmission pump 29 by executing the warm-up operation using the warm-up hydraulic circuit 59 in the pump brake control. In this case, the pump brake torque can be increased by increasing the load on the transmission pump 29. The hydraulic pump connected to the warm-up hydraulic circuit 59 is not limited to the transmission pump 29 and may be another hydraulic pump.

The pump brake torque control unit 92 may determine the predetermined vehicle speed threshold on the basis of the speed range selected with the speed change operating member 53*a*. For example, a vehicle speed threshold corresponding to a speed range of a lower speed such as a first velocity or a second velocity may be set instead of a vehicle speed threshold corresponding to the speed range of the highest speed. In this case, the braking force can be increased when the vehicle speed meets or exceeds the vehicle speed threshold in accordance with a speed range selected with the speed change operating member 53*a*. As a result, the braking force can be increased when the vehicle speed exceeds the speed range selected with the speed change operating member 53*a*.

The pump brake torque control unit 92 may determine the predetermined vehicle speed threshold on the basis of a selection using the FR operating member 54*a*. That is, a vehicle speed threshold during forward travel and a vehicle speed threshold during reverse travel may be set to different values. In this case, the braking force can be increased when the vehicle speed meets or exceeds a vehicle speed threshold in accordance with the travel direction selected with the FR operating member 54*a*. A vehicle speed threshold for each speed range during forward travel and a vehicle speed threshold for each speed range during reverse travel may be set to different values.

According to the exemplary embodiments of the present invention, a hybrid-type work vehicle that is able to obtain a large braking force while suppressing an excessive rise in the engine rotation speed during braking, and a control method for the hybrid-type work vehicle are provided.

What is claimed is:

1. A work vehicle comprising:
   an engine;
   a hydraulic pump driven by the engine;
   a travel device driven by the engine;
   a power transmission device that transmits driving power from the engine to the travel device;
   a power take-off device for distributing driving power from the engine to the hydraulic pump and the power transmission device; and
   a control unit for controlling the hydraulic pump and the power transmission device,
   the power transmission device including
      an input shaft;
      an output shaft;
      a gear mechanism that has a planetary gear mechanism and that transmits rotation of the input shaft to the output shaft; and
      a motor connected to rotating elements of the planetary gear mechanism,
   the power transmission device being configured so that a rotation speed ratio of the output shaft with respect to the input shaft is changed by changing a rotation speed of the motor, and
   the control unit including
      a pump brake control determining unit that determines whether to execute a pump brake control for causing a braking force to be generated by using a load on the hydraulic pump during braking; and
      a pump brake torque control unit that increases a pump brake torque that corresponds to the load on the hydraulic pump during the pump brake control.

2. The work vehicle according to claim 1, wherein the pump brake control determining unit determines that the pump brake control is to be executed when an engine regenerative torque regenerated in the engine from the travel device through the power transmission device is equal to or greater than a predetermined torque threshold.

3. The work vehicle according to claim 1, wherein the pump brake control determining unit determines that the pump brake control is to be executed when the engine rotation speed meets or exceeds a predetermined rotation speed threshold.

4. The work vehicle according to claim 1, wherein the pump brake control determining unit controls the pump brake torque on the basis of an engine regenerative torque regenerated in the engine from the travel device through the power transmission device.

5. The work vehicle according to claim 4, further comprising
   an energy reservoir unit for storing energy regenerated by the motor;
   the control unit further including
      a target braking power determining unit that determines a target braking power; and
      a reservoir power computing unit that computes a reservoir power of the energy reservoir unit, the pump brake torque control unit determining the engine regenerative torque on the basis of the target braking power and the reservoir power.

6. The work vehicle according to claim 1, wherein
the pump brake torque control unit controls the pump brake torque so that the engine rotation speed meets a target engine rotation speed while the pump brake control is being executed.

7. The work vehicle according to claim 1, wherein
the pump brake torque control unit increases the pump brake torque when the vehicle speed reaches or exceeds a predetermined vehicle speed threshold.

8. The work vehicle according to claim 7, further comprising
a speed change operating member for selecting a speed range that defines an upper limit of the vehicle speed,
the pump brake torque control unit determining the predetermined vehicle speed threshold on the basis of the speed range selected with the speed change operating member.

9. The work vehicle according to claim 7, further comprising
a forward/reverse travel operating member for switching between forward travel and reverse travel of the vehicle,
the pump brake torque control unit determining the predetermined vehicle speed threshold on the basis of a selection with the forward/reverse travel operating member.

10. The work vehicle according to claim 1, further comprising
a work implement having a hydraulic cylinder,
the hydraulic pump discharging hydraulic fluid for driving the hydraulic cylinder.

11. The work vehicle according to claim 10, further comprising
a relief valve provided parallel to the hydraulic cylinder in a hydraulic circuit; and
a pump brake control valve that controls the hydraulic fluid supplied to the relief valve,
the pump brake torque control unit increasing a load on the hydraulic pump by controlling the pump brake control valve.

12. The work vehicle according to claim 11, further comprising
a work implement operating member for operating the work implement,
the control unit further including
a required pump flow rate determining unit for determining a required flow rate of the hydraulic pump on the basis of the pump brake torque; and
a work implement requirement determining unit for determining a required flow rate of the hydraulic cylinder on the basis of an operating amount of the work implement operating member,
the pump brake torque control unit determining a flow rate of the pump brake control valve on the basis of the required flow rate of the hydraulic pump and the required flow rate of the hydraulic cylinder.

13. The work vehicle according to claim 1, further comprising
a cooling fan for cooling a cooling water for the engine; and
a fan motor for driving the cooling fan,
the hydraulic pump discharging hydraulic fluid for driving the fan motor, and
the pump brake torque control unit increasing a load on the hydraulic pump by increasing a rotation speed of the fan motor.

14. The work vehicle according to claim 1, further comprising
a warm-up hydraulic circuit connected to the hydraulic pump,
the pump brake torque control unit increasing the load on the hydraulic pump by executing a warm-up operation to increase a temperature of the hydraulic fluid using the warm-up hydraulic circuit.

15. The work vehicle according to claim 1, further comprising
a work implement having a hydraulic cylinder driven by hydraulic fluid discharged from the hydraulic pump;
a work implement operating member for operating the work implement;
a relief valve provided parallel to the hydraulic cylinder in a hydraulic circuit;
a pump brake control valve that controls the hydraulic fluid supplied to the relief valve; and
an energy reservoir unit for storing energy regenerated by the motor,
the control unit including
a target braking power determining unit that determines a target braking power;
a reservoir power computing unit that computes a reservoir power of the energy reservoir unit;
a required pump flow rate determining unit for determining a required flow rate of the hydraulic pump on the basis of the pump brake torque; and
a work implement requirement determining unit for determining a required flow rate of the hydraulic cylinder on the basis of an operating amount of the work implement operating member,
the pump brake torque control unit determining an engine regenerative torque regenerated in the engine from the travel device through the power transmission device on the basis of the target braking power and the reservoir power,
the pump brake control determining unit determining that the pump brake control is to be executed when the engine regenerative torque meets or exceeds a predetermined torque threshold and an engine rotation speed meets or exceeds a predetermined rotation speed threshold,
the pump brake torque control unit determining the pump brake torque so that the engine rotation speed meets the target engine rotation speed while the pump brake control is being executed,
the pump brake torque control unit determining a flow rate of the pump brake control valve on the basis of the required flow rate of the hydraulic cylinder determined on the basis of the pump brake torque and the required flow rate of the hydraulic pump, and
the pump brake torque control unit increasing a load on the hydraulic pump by controlling the pump brake control valve.

16. The control method for a work vehicle, the work vehicle including
an engine;
a hydraulic pump driven by the engine;
a travel device driven by the engine;
a power transmission device that transmits driving power from the engine to the travel device; and a power take-off device for distributing driving power from the engine to the hydraulic pump and the power transmission device,
the power transmission device including
an input shaft;
an output shaft;
a gear mechanism that has a planetary gear mechanism and that transmits rotation of the input shaft to the output shaft; and
a motor connected to rotating elements of the planetary gear mechanism,
the power transmission device being configured so that a rotation speed ratio of the output shaft with respect to the input shaft is changed by changing a rotation speed of the motor, and
the method comprising:
a step for determining whether to execute a pump brake control for causing a braking force to be generated due to a load on the hydraulic pump during braking; and
a step for increasing a pump brake torque to correspond to the load on the hydraulic pump during the pump brake control.

\* \* \* \* \*